US008605945B2

(12) United States Patent
El-Maleh et al.

(10) Patent No.: US 8,605,945 B2
(45) Date of Patent: *Dec. 10, 2013

(54) MULTI-MODE REGION-OF-INTEREST VIDEO OBJECT SEGMENTATION

(75) Inventors: Khaled Helmi El-Maleh, San Marcos, CA (US); Haohong Wang, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,736

(22) Filed: Apr. 2, 2012

(65) Prior Publication Data

US 2012/0189168 A1    Jul. 26, 2012

Related U.S. Application Data

(63) Continuation of application No. 11/349,659, filed on Feb. 7, 2006, now Pat. No. 8,150,155.

(51) Int. Cl.
*G06K 9/00* (2006.01)

(52) U.S. Cl.
USPC .......................................... 382/103

(58) Field of Classification Search
USPC .................................. 382/173–180
See application file for complete search history.

(56) References Cited

U.S. PATENT DOCUMENTS

| 4,951,140 A | 8/1990 | Ueno et al. |
| 5,048,095 A | 9/1991 | Bhanu et al. |
| 5,150,432 A | 9/1992 | Ueno et al. |
| 5,323,470 A | 6/1994 | Kara et al. |
| 5,327,232 A | 7/1994 | Kim |
| 5,692,063 A | 11/1997 | Lee et al. |

(Continued)

FOREIGN PATENT DOCUMENTS

| EP | 0472806 A2 | 3/1992 |
| EP | 1211640 A2 | 6/2002 |

(Continued)

OTHER PUBLICATIONS

Athitsos V et al: "Skin Color-Based Video Segmentation under TimeVarying Illumination" IEEE Transactions on Pattern Analysis and Machine Intelligence, IEEE, New York, NY, US, vol. 26, No. 7, Jul. 2004, pp. 862-877, XP0111134291SSN: 0162-8828.

(Continued)

*Primary Examiner* — Alex Liew
(74) *Attorney, Agent, or Firm* — Todd E. Marlette

(57) ABSTRACT

The disclosure is directed to techniques for automatic segmentation of a region-of-interest (ROI) video object from a video sequence. ROI object segmentation enables selected ROI or "foreground" objects of a video sequence that may be of interest to a viewer to be extracted from non-ROI or "background" areas of the video sequence. Examples of a ROI object are a human face or a head and shoulder area of a human body. The disclosed techniques include a hybrid technique that combines ROI feature detection, region segmentation, and background subtraction. In this way, the disclosed techniques may provide accurate foreground object generation and low-complexity extraction of the foreground object from the video sequence. A ROI object segmentation system may implement the techniques described herein. In addition, ROI object segmentation may be useful in a wide range of multimedia applications that utilize video sequences, such as video telephony applications and video surveillance applications.

23 Claims, 15 Drawing Sheets

(56) References Cited

U.S. PATENT DOCUMENTS

| | | | |
|---|---|---|---|
| 5,737,449 A | 4/1998 | Lee | |
| 5,760,846 A | 6/1998 | Lee | |
| 5,764,283 A | 6/1998 | Pingali et al. | |
| 5,774,591 A | 6/1998 | Black et al. | |
| 5,781,249 A | 7/1998 | Hwang | |
| 5,828,769 A | 10/1998 | Burns | |
| 5,838,391 A | 11/1998 | Kim | |
| 5,852,669 A | 12/1998 | Eleftheriadis et al. | |
| 5,864,630 A | 1/1999 | Cosatto et al. | |
| 6,023,183 A | 2/2000 | Cao et al. | |
| 6,026,183 A | 2/2000 | Talluri et al. | |
| 6,035,067 A | 3/2000 | Ponticos | |
| 6,141,041 A | 10/2000 | Carlbom et al. | |
| 6,148,092 A | 11/2000 | Qian | |
| 6,188,777 B1 | 2/2001 | Darrell et al. | |
| 6,292,575 B1 | 9/2001 | Bortolussi et al. | |
| 6,297,846 B1 | 10/2001 | Edanami | |
| 6,301,370 B1 | 10/2001 | Steffens et al. | |
| 6,335,985 B1 | 1/2002 | Sambonsugi et al. | |
| 6,343,141 B1 | 1/2002 | Okada et al. | |
| 6,456,328 B1 | 9/2002 | Okada | |
| 6,477,201 B1 | 11/2002 | Wine et al. | |
| 6,480,615 B1 * | 11/2002 | Sun et al. | 382/103 |
| 6,504,942 B1 | 1/2003 | Hong et al. | |
| 6,580,821 B1 | 6/2003 | Roy | |
| 6,661,907 B2 | 12/2003 | Ho et al. | |
| 6,668,070 B2 | 12/2003 | Kondo et al. | |
| 6,680,745 B2 | 1/2004 | Center, Jr. et al. | |
| 6,731,799 B1 | 5/2004 | Sun et al. | |
| 6,754,389 B1 | 6/2004 | Dimitrova et al. | |
| 6,819,778 B2 | 11/2004 | Kamei | |
| 6,819,796 B2 | 11/2004 | Hong et al. | |
| 6,826,292 B1 | 11/2004 | Tao et al. | |
| 6,829,395 B2 | 12/2004 | Alm | |
| 6,870,945 B2 | 3/2005 | Schoepflin et al. | |
| 6,885,761 B2 | 4/2005 | Kage | |
| 6,909,455 B1 | 6/2005 | Edwards et al. | |
| 6,924,832 B1 | 8/2005 | Shiffer et al. | |
| 6,947,601 B2 | 9/2005 | Aoki et al. | |
| 6,970,598 B1 | 11/2005 | Nagarajan et al. | |
| 6,993,201 B1 | 1/2006 | Haskell et al. | |
| 6,999,600 B2 | 2/2006 | Venetianer et al. | |
| 6,999,604 B1 | 2/2006 | Kim et al. | |
| 7,039,219 B2 | 5/2006 | Liu et al. | |
| 7,043,059 B2 | 5/2006 | Cheatle et al. | |
| 7,068,842 B2 | 6/2006 | Liang et al. | |
| 7,092,555 B2 | 8/2006 | Lee et al. | |
| 7,123,745 B1 | 10/2006 | Lee | |
| 7,127,083 B2 | 10/2006 | Han et al. | |
| 7,130,446 B2 | 10/2006 | Rui et al. | |
| 7,136,507 B2 | 11/2006 | Han et al. | |
| 7,190,809 B2 | 3/2007 | Gutta et al. | |
| 7,212,670 B1 | 5/2007 | Rousselle et al. | |
| 7,227,893 B1 | 6/2007 | Srinivasa et al. | |
| 7,277,580 B2 | 10/2007 | Xu | |
| 7,292,731 B2 | 11/2007 | Sekiguchi et al. | |
| 7,391,907 B1 | 6/2008 | Venetianer et al. | |
| 7,409,076 B2 | 8/2008 | Brown et al. | |
| 7,423,669 B2 | 9/2008 | Oya et al. | |
| 7,460,693 B2 | 12/2008 | Loy et al. | |
| 7,469,054 B2 | 12/2008 | Aratani et al. | |
| 7,477,759 B2 | 1/2009 | Kaplan | |
| 7,526,102 B2 | 4/2009 | Ozer | |
| 7,536,032 B2 | 5/2009 | Bell | |
| 7,570,281 B1 | 8/2009 | Ono | |
| 7,583,287 B2 | 9/2009 | Cohen et al. | |
| 7,602,944 B2 | 10/2009 | Campbell et al. | |
| 7,630,561 B2 | 12/2009 | Porter et al. | |
| 8,150,155 B2 | 4/2012 | El-Maleh et al. | |
| 8,265,349 B2 | 9/2012 | Wang et al. | |
| 8,265,392 B2 | 9/2012 | Wang et al. | |
| 2002/0136448 A1 | 9/2002 | Bortolussi et al. | |
| 2002/0168091 A1 | 11/2002 | Trajkovic | |
| 2003/0123541 A1 | 7/2003 | Jun et al. | |
| 2003/0223622 A1 | 12/2003 | Simon et al. | |
| 2004/0005084 A1 | 1/2004 | Kondo et al. | |
| 2004/0017930 A1 | 1/2004 | Kim et al. | |
| 2004/0028259 A1 | 2/2004 | Kondo et al. | |
| 2004/0037460 A1 | 2/2004 | Luo et al. | |
| 2004/0091170 A1 | 5/2004 | Cornog et al. | |
| 2004/0181747 A1 | 9/2004 | Hull et al. | |
| 2004/0197011 A1 | 10/2004 | Camus et al. | |
| 2004/0228530 A1 | 11/2004 | Schwartz et al. | |
| 2005/0036704 A1 | 2/2005 | Dumitras et al. | |
| 2005/0094849 A1 | 5/2005 | Sung et al. | |
| 2005/0104960 A1 | 5/2005 | Han et al. | |
| 2005/0249387 A1 | 11/2005 | Machida | |
| 2006/0067562 A1 | 3/2006 | Kamath et al. | |
| 2007/0269082 A1 | 11/2007 | Matsuyama | |

FOREIGN PATENT DOCUMENTS

| | | |
|---|---|---|
| EP | 1225769 A2 | 7/2002 |
| GB | 2341231 A | 3/2000 |
| JP | 59194274 | 11/1984 |
| JP | 2000082147 A | 3/2000 |
| JP | 2003174504 A | 6/2003 |
| JP | 2003526841 T | 9/2003 |
| JP | 2004054960 A | 2/2004 |
| JP | 2004220555 A | 8/2004 |
| JP | 2004538543 A | 12/2004 |
| JP | 2005293539 A | 10/2005 |
| WO | 0116868 A1 | 3/2001 |
| WO | 02063599 A1 | 8/2002 |
| WO | 03107677 A1 | 12/2003 |

OTHER PUBLICATIONS

Cavallaro A. et al., "Tracking Video Objects in Cluttered Background", IEEE Trans. Circuits and Systems for Video Technology, vol. 15, No. 4, Apr. 2005, pp. 575-584.

Chai, at al.: "Face Segmentation Using Skin-Color Map in Videophone Applications," IEEE Transactions on Circuits and Systems for Video Technology, vol. 9, No. 4 (Jun. 1999), pp. 551-564, XP011014577. ISSN:1051-8215.

Challapali, et al., "Real-time object segmentation and coding for selective-quality video communications", IEEE Trans. Circuits and Systems for Video Technology, Jun. 2004, pp. 813-824, vol. 14, No. 6.

Chang, et al., "Simultaneous motion estimation and segmentation", IEEE Trans. Image Processing, vol. 6, Sep. 1997, pp. 1326-1333.

Choi, et al., "Spatio-temporal video segmentation using a joint similarity measure", IEEE Trans. Circuits and System for Video Technology, 1997, pp. 279-285, vol. 7.

Edmonds J et al., "Maximum Matching and Polyhedron with 0, 1-Vertices", 1 Res. Nat. Bar. Standards 69B, pp. 125-130, 1965.

Elgammal "Efficient kernel density estimation using the fast Gauss Transform with applications to color modeling and tracking", IEEE Trans. Pattern Analysis and Machine Intelligence, Nov. 2003, pp. 1499-1504, vol. 25, No. 11.

Elgammal, et al., "Background and foreground modeling using nonparametric kernel estimation for visual surveillance", Proceedings of the IEEE, Jul. 2002, p. 1151-1163, vol. 90, No. 7.

European Search Report—EP11171949—Search Authority—Munich—Sep. 12, 2011.

European Search Report—EP11171951—Search Authority—Munich—Sep. 12, 2011.

Gabow, "An efficient implementation of Edmonds' algorithm for maximum matching on graphs", J. ACM, Apr. 1976, pp. 221-234, vol. 23, No. 2.

Herodotou N et al: "Automatic location and tracking of the facial region in color video sequences" Signal Processing. Image Communication, Elsevier Science Publishers, Amsterdam, NL, vol. 14, No. 5, Mar. 1999, pp. 359-388, XP004163260.

Hjelmas E., "Face Detection: A Survey". Computer Vision and Image Understanding, vol. 83, pp. 236-274, 2001.

Hsu, et al. (2002) Face detection in color images. IEEE Transactions on Pattern Analysis and Machine Intelligence, vol. 24(5), 696-706.

Hu M et al: "Automatic scalable face model design for 2D Model-based video coding" Signal Processing. Image Communication,

(56) References Cited

OTHER PUBLICATIONS

Elsevier Science Publishers, Amsterdam, NL, vol. 19, No. 5, May 2004, pp. 421-436, XP004504929.

Hu W et al: "A Survey on Visual Surveillance of Object Motion and Behaviors" IEEE Transactions on Systems, Man, and Cybernetics: Part C: Applications and Reviews, IEEE Service Center, Piscataway, NJ, US, vol. 34, No. 3, Aug. 2004, pp. 334-352, XP011114887.

International Search Report—PCT/US07/061804, International Search Authority—European Patent Office—Jun. 12, 2007.

Kui Zhang et al: "Motion based image segmentation for video coding" Proceedings of the International Conference on Image Processing. (ICIP). Washington, Oct. 23-26, 1995, Los Alamitos, IEEE Comp. Soc. Press, US vol. vol. 3, Oct. 23, 1995, pp. 476-479, XP010197225.

Li H et al: "Automatic Text Detection and Tracking in Digital Video" IEEE Transactions on Image Processing, IEEE Service Center, Piscataway, NJ, US, col. 9, No. 1, Jan. 2000, pp. 147-156, XP000908664.

Liu Long "Video Motion Object Segmentation", Xi'An Institute of Technology, Nov. 30, 2005, pp. 8-23.

Liu Zhi Yang J et al: "An efficient face segmentation algorithm based on binary partition tree" Signal Processing. Image Communication, Elsevier Science Publishers, Amsterdam, NL, vol. 20, No. 4, Apr. 2005 pp. 295-314, XP004820419.

Lu Yan et al: "Automatic video segmentation using a oovel background modcl" Proceedings—IEEE International Symposium on Circuits and Systems. vol. 3. May 29, 2002, pp. IIIf807-JIJfS10. XPOO244S1 3 Phoenix, AZ, United States.

Luo, et al., "Model-based segmentation and tracking of head and shoulder video objects for real time multimedia services", IEEE Trans. Multimedia, Sep. 2003, p. 379-389, vol. 5, No. 3.

Panin G et al: "An Efficient and Robust Real-Time Contour Tracking System" Computer Vision Systems, 2006 ICVS 06. IEEE International Conference on New York, NY, USA Jan. 4-7, 2006, Piscataway, NJ, USA,IEEE, Jan. 4, 2006, pp. 44-44, XP01 0899397 ISBN: 0-7695-2506-7.

"Robust Online Change-point Detection in Video Sequences" Computer Vision and Pattern Recognition Workshop, 2006 Conference on New York, NY, USA Jun. 17-22, 2006, Piscataway, NJ, USA, IEEE, Jun. 17, 2006, pp. 155-155, XP010922972.

Serra J., Image Analysis and Mathematical Morphology, New York: Academic, 1982.

Tian, et al., "Multi-state based facial feature tracking an detection", Carnegie Mello University Technical Report CMU-RI-TR-99-18, Aug. 1999, pp. 1-30.

Votsis G N et al: "A modular approach to facial feature segmentation on real sequences" Signal Processing. Image Communication, Elsevier Science Publishers, Amsterdam, NL, vol. 18, No. 1, Jan. 2003, pp. 67-89, XP004363726.

Wang et al., "A highly efficient system for automatic face region detection in MPEG video." IEEE Trans. on Circuits and Systems for Video Technology, vol. 7 Issue 4, Aug. 1997, pp. 615-628.

Wong K. et al., "A Robust Scheme for Live Detection of Human Faces in Color Images", Signal Processing: Image Communication, vol. 18, pp. 103-114. 2003.

Written Opinion PCT/US07/061804, International Search Authority—European Patent Office—Jun. 12, 2007.

Yang et al., Detecting Faces in Images—A Survey, IEEE PAMI, vol. 24, No. 1, pp. 34-58, Jan. 2002.

Zillani F et al: "Effective integration of object tracking in a video coding scheme for multisensor surveillance systems" Proceedings 2002 International Conference on Image Processing, ICIP 2002. Rochester, NY, Sep. 22-25, 2002, International Conference on Image Processing, New York, NY: IEEE, US, vol. vol. 2 of 3, Sep. 22, 2002, pp. 521-524, XP010607375.

Hong, G.Y., et al.,"An intelligent video categorization engine", Kybernetes: The International Journal of Systems & Cybernetics, vol. 34, No. 6, Jun. 2005, pp. 784-802.

Kim, M., et al., "Moving object segmentation in video sequences by user interaction and automatic object tracking", Image and Vision Computing, Elsevier, Guildford, GB, vol. 19, No. 5, Apr. 1, 2001, pp. 245-260, XP027320286, [retrieved on Apr. 1, 2001].

Marcotegui, B., et al., "A video object generation tool allowing friendly user interaction", Image Processing, 1999, ICIP 99 Proceedings. 1999 International Conference On- Kobe, Japan Oct. 24-28, 1999, IEEE, Piscataway, NJ, USA, vol. 2, Oct. 24, 1999, pp. 391-395, XP01 0368990.

Salembier P., et al.,"Region-based representations of image and video: Segmentation tools for multimedia services", IEEE Transactions on Circuits and Systems for Video Technology, vol. 9, No. 8, Dec. 1999, pp. 1147-1169.

Salembier P., et al.,"Region-based video coding using mathematical morphology", Proceedings of the IEEE vol. 83, No. 6, Jun. 1995, pp. 843-857.

Stauffer C et al: "Adaptive background mixture models for real-time tracking", Proceedings of the 1999 IEEE Computer Society Conference on Computer Vision and Pattern Recognition, Jun. 23-25, 1999; Fort Collins, Colorado, IEEE, The Institute of Electrical and Electronics Engineers, Inc, US, vol. 2, Jun. 23, 1999, pp. 246-252, XP010347611, ISBN: 978-0-7695-0149-9.

\* cited by examiner

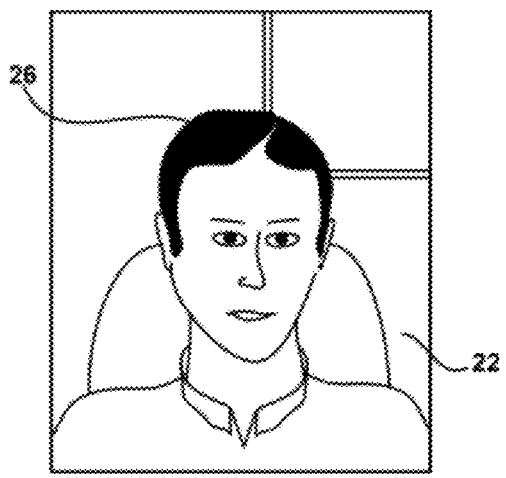
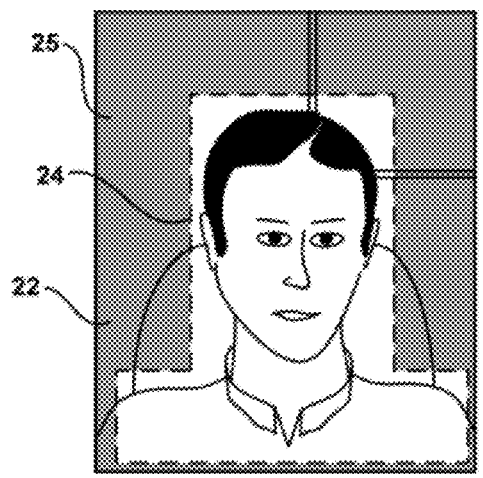
FIG. 2A　　　　FIG. 2B

(a) Original image  (b) Detected face  (c) after morphological operations (a) Original image  (b) Eye map C  (c) Eye candidates (a) Feature map      (b) two possible eye-mouth triangles

MULTI-MODE REGION-OF-INTEREST VIDEO OBJECT SEGMENTATION

CROSS REFERENCE TO RELATED APPLICATIONS

The present application is a continuation of U.S. patent application Ser. No. 11/349,659, which was filed on Feb. 7, 2006 and which is hereby incorporated by reference in its entirety.

TECHNICAL FIELD

The disclosure relates to video object segmentation and, more particularly, techniques for automatic segmentation of region-of-interest (ROI) video objects from video sequences for multimedia applications.

BACKGROUND

Automatic region-of-interest (ROI) video object segmentation may be useful for a wide range of multimedia applications that utilize video sequences. An ROI object may be referred to as a "foreground" object within a video frame and non-ROI areas may be referred to as "background" areas within the video frame. ROI object segmentation enables selected foreground objects of a video sequence that may be of interest to a viewer to be extracted from the background of the video sequence. Multimedia applications may then preferentially utilize the ROI object segmented from the video sequence. Typical examples of an ROI object are a human face or a head and shoulder area of a human body.

In video surveillance applications, for example, an ROI object segmented from a captured video sequence can be input into a facial database system. The facial database system may use the segmented ROI object, e.g., a human face, to accurately match with target face objects stored within the database. Law enforcement agencies may utilize this application of ROI object segmentation to identify suspects from surveillance video sequences.

As another example, in video telephony (VT) applications an ROI object segmented from a captured video sequence can be input into a video sequence encoder. The video sequence encoder may allocate more resources to the segmented ROI object to code the ROI object with higher quality for transmission to a recipient. VT applications permit users to share video and audio information to support applications such as videoconferencing. In a VT system, users may send and receive video information, only receive video information, or only send video information. A recipient generally views received video information in the form in which it is transmitted from a sender. With preferential encoding of the segmented ROI object, a recipient is able to view the ROI object more clearly than non-ROI areas of the video sequence.

Other examples include video broadcasting applications in which a person presents informational video such as a live or prerecorded news or entertainment broadcast. In such applications, it may be desirable to preferentially encode an ROI object corresponding to the face of a human presenter, such as a news reporter or talk show host.

Conventionally, automatic ROI object segmentation focuses on motion analysis, motion segmentation and region segmentation. In one case, a statistical model-based object segmentation algorithm abstracts an ROI object into a blob-based statistical region model and a shape model. Thus, the ROI object segmentation problem may be converted into a model detection and tracking problem. In another case, a foreground object may be extracted from a video frame based on disparity estimation between two views from a stereo camera setup. A further case proposes a ROI object segmentation algorithm that includes both region-based and feature-based segmentation approaches. The algorithm uses region descriptors to represent the object regions, which are homogeneous with respect to the motion, color and texture features, and tracks them across the video sequence.

SUMMARY

The disclosure is directed to techniques for automatic segmentation of a region-of-interest (ROI) video object from a video sequence. ROI object segmentation enables selected ROI or "foreground" objects of a video sequence to be extracted from non-ROI or "background" areas of the video sequence. Examples of an ROI object are a human face or a head and shoulder area of a human body. The disclosed techniques include a hybrid technique that combines ROI feature detection, region segmentation, and background subtraction. In this way, the disclosed techniques may provide accurate foreground object generation and low-complexity extraction of the foreground object from the video sequence.

The disclosed techniques also include a technique for verification of facial features detected within a video frame of the video sequence based on inherent properties of facial features, such as symmetric location and shape characteristics. In addition, the disclosed techniques include a technique for separation of detected facial features for multiple individual faces within a video frame of the video sequence. As described herein, the multi-face separation technique may be mapped into a maximum matching graph theory problem that reduces computational complexity from exponential to polynomial. In this way, the techniques provide accurate feature detection for each face within a frame of the video sequence.

An ROI object segmentation system, for example, may implement the techniques described herein. The ROI object segmentation system supports intra-mode segmentation and inter-mode segmentation. Intra-mode segmentation is a high-complexity segmentation mode that processes a frame of a video sequence independently from other frames in the video sequence without using ROI object motion information. Inter-mode segmentation is a low-complexity segmentation mode that processes a frame of a video sequence based on motion information for the ROI object indicating motion between the current frame and a previous or subsequent frame of the video sequence. The ROI object segmentation system may support multi-mode segmentation. In particular, the ROI object segmentation system may decide whether to perform intra-mode segmentation or inter-mode segmentation on a received frame based on one or more segmentation mode decision factors indicating the need for high-complexity segmentation or low-complexity segmentation.

The disclosed techniques may further include a technique for generation of a foreground object during intra-mode segmentation by automatically selecting defined regions of a video frame located within an ROI object shape from a set of candidate regions within the entire frame. The disclosed techniques also include a technique for detecting moving regions within a foreground object during inter-mode segmentation based on background modeling and subtraction. Successfully detecting the moving foreground region may improve performance speed of ROI feature detection during inter-mode segmentation.

In one embodiment, the disclosure provides a method comprising receiving a video frame of a video sequence and applying one or more segmentation mode decision factors to the video frame. The method also comprises segmenting a ROI object from the video frame without reference to motion information for the video frame when the one or more segmentation mode decision factors select a high-complexity segmentation mode, and segmenting a ROI object from the video frame based on motion information for the video frame and a different video frame of the video sequence when the one or more segmentation mode decision factors select a low-complexity segmentation mode.

In another embodiment, the disclosure provides a computer-readable medium comprising instructions that cause the programmable processor to receive a video frame of a video sequence and apply one or more segmentation mode decision factors to the video frame. The instructions also cause the programmable processor to segment a ROI object from the video frame without reference to motion information for the video frame when the one or more segmentation mode decision factors select a high-complexity segmentation mode, and segment a ROI object from the video frame based on motion information for the video frame and a different video frame of the video sequence when the one or more segmentation mode decision factors select a low-complexity segmentation mode.

In another embodiment, a video encoding device including a processor programmed to apply one or more segmentation mode decision factors to a video frame of a video sequence to select a high-complexity segmentation mode or a low-complexity segmentation mode, segment a region of interest (ROI) object from the video frame without reference to motion information for the video frame when the high-complexity segmentation mode is selected, and segment an ROI object from the video frame based on motion information for the video frame and a different video frame of the video sequence when the low-complexity segmentation mode is selected.

The techniques described herein may be implemented in hardware, software, firmware, or any combination thereof. If implemented in software, the techniques may be realized in part by a computer readable medium comprising program code containing instructions that, when executed by a programmable processor, performs one or more of the methods described herein.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 2A and 2B are diagrams illustrating a definition of an ROI object and a non-ROI area within a video frame of a video sequence.

DETAILED DESCRIPTION

Figure 1:
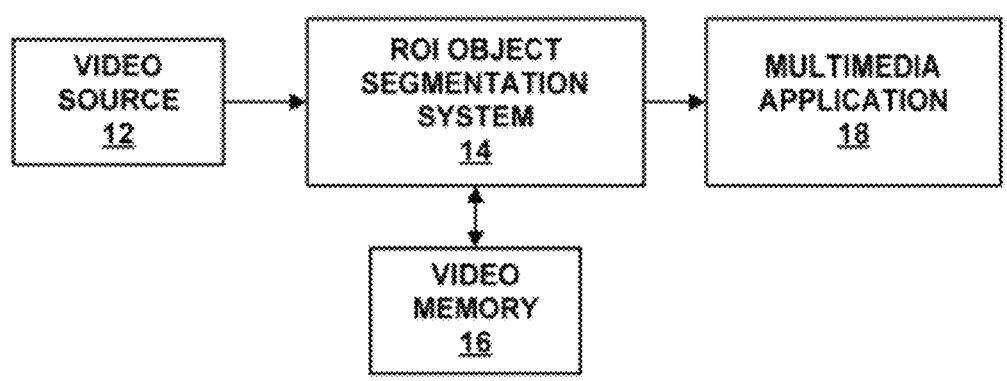
FIG. 1 is a block diagram illustrating a region-of-interest (ROI) object segmentation system that implements techniques for automatic segmentation of an ROI video object from a video sequence.

FIG. 1 is a block diagram illustrating a region-of-interest (ROI) object segmentation system 14 that implements techniques for automatic segmentation of a ROI video object from a video sequence. ROI object segmentation may be useful in a wide range of multimedia applications that utilize video sequences, such as video telephony (VT) applications and video surveillance applications.

For example, in video surveillance applications a ROI object segmented from a captured video sequence can be input into a facial database system. The facial database system may use the segmented ROI object, e.g., a human face, to accurately match with target face objects stored within the database.

As another example, in VT applications a ROI object segmented from a captured video sequence can be input into a video sequence encoder. The video sequence encoder may allocate more resources to the segmented ROI object to code the ROI object with higher quality for transmission to a recipient.

Other examples include video broadcasting applications in which a person presents informational video such as a live or prerecorded news or entertainment broadcast. In such applications, it may be desirable to preferentially encode an ROI object corresponding to the face of a human presenter, such as a news reporter or talk show host.

As shown in FIG. 1, system 14 receives a video sequence from video source 12. Video source 12 may be a video capture device, such as a camera, that obtains a video sequence, or a video archive storing a pre-recorded video sequence. System 14 automatically segments an ROI object from the received video sequence. ROI object segmentation system 14 stores video frames of the video sequence obtained from video source 12 in video memory 16 during the ROI object segmentation process. After each frame of the video sequence is processed, system 14 sends an output image of the segmented video frame to a multimedia application 18.

For example, an ROI object may comprise a human face or a head and shoulder area of a human body. The ROI object may be referred to as a "foreground" object within a video frame and non-ROI areas may be referred to as "background" areas within the video frame. ROI object segmentation system 14 extracts one or more selected foreground objects of frames in a video sequence that may be of interest to a user of multimedia application 18 from background areas of the video sequence. Multimedia application 18 may preferentially utilize the ROI object segmented from the video sequence. In one embodiment, multimedia application 18 may comprise a video surveillance application incorporating a facial database system. In another embodiment, multimedia application 18 may comprise a video telephony (VT) application incorporating ROI-enabled video encoder-decoders (CODECs).

In the embodiment where multimedia application 18 comprises a video surveillance application, a ROI object segmented from a captured video sequence can be input into a facial database system. In this case, video source 12 may be a video archive that stores a pre-recorded video sequence from a surveillance camera. The facial database system may use the segmented ROI object, e.g., a human face, to accurately match with target face objects stored within the database. Law enforcement agencies may utilize ROI object segmentation system 14 with a facial database system in order to identify suspects from surveillance video sequences.

In an embodiment in which multimedia application 18 comprises a VT application, a ROI object segmented from a captured video sequence can be input into a ROI-enabled video encoder. VT applications permit users to share video and audio information to support applications such as video-conferencing. In a VT system, users may send and receive video information, only receive video information, or only send video information. In this case, video source 12 may be a video capture device, such as a camera, that obtains a video sequence. For example, video source 12 may comprise a video camera included within a communication device capable of participating in video telephony with another communication device.

A ROI-enabled video encoder may reside within a communication device that further includes appropriate transmit, receive, modem, and processing electronics to support wired or wireless communication. For example, the ROI-enabled video encoder may reside within a wireless mobile terminal or a wired terminal equipped for communication with other terminals. Examples of wireless mobile terminals include mobile radio telephones, mobile personal digital assistants (PDAs), mobile computers, or other mobile devices equipped with wireless communication capabilities and video encoding and/or decoding capabilities. For example, the ROI-enabled video encoder may reside within a so-called camera phone or video phone used in VT applications. Examples of wired terminals include desktop computers, video telephones, network appliances, set-top boxes, interactive televisions, or the like.

The ROI-enabled video encoder may preferentially encode the segmented ROI object included in the output image received from ROI object segmentation system 14. For example, the ROI-enabled video encoder may allocate additional coding bits to the ROI object of the video frame and allocate a reduced number of coding bits to non-ROI areas of the video frame. In mobile applications, in particular, the amount of encoding bits available to encode a video frame can be low and vary according to wireless channel conditions. Accordingly, preferential allocation of coding bits to ROI objects can be helpful in improving the visual quality of the ROI object while efficiently conforming to applicable bit rate requirements. Hence, with preferential encoding of the ROI object, a recipient is able to view the ROI object more clearly than non-ROI areas of the video sequence. The encoded video frame may then be transmitted over a wired or wireless communication channel to another communication device.

As described above, ROI object segmentation system 14 may implement techniques for automatic segmentation of a ROI video object from a video sequence. The disclosed techniques include a hybrid technique that combines detecting ROI features (i.e., a face mask and facial features) within a video frame of the video sequence, segmenting the video frame into multiple candidate regions, and performing background (non-ROI) subtraction based on the video frame and a previous video frame of the video sequence. In this way, the disclosed techniques may provide accurate foreground (ROI) object generation and low-complexity extraction of the foreground object from frames in the video sequence.

The disclosed techniques also include a technique for verification of facial features detected within a video frame of the video sequence based on inherent properties of facial features, such as symmetric location and shape characteristics. In addition, the disclosed techniques include a technique for separation of detected facial features for multiple individual faces within a video frame of the video sequence. As described herein, the multi-face separation technique may be mapped into a maximum matching scheme problem that reduces computational complexity from exponential to polynomial. In this way, the techniques provide accurate feature detection for each face within a frame of the video sequence with reduce processing requirements.

ROI object segmentation system 14 supports multiple, e.g., two, modes of segmentation: intra-mode and inter-mode. Intra-mode segmentation processes a frame of a video sequence independently from other frames in the video sequence. In this case, no ROI object motion information is used. Intra-mode segmentation is a first, high-complexity segmentation mode. Inter-mode segmentation is a second, low-complexity segmentation mode that processes a frame of a video sequence based on previous or subsequent frame information, and is generally a lower complexity segmentation mode. The inter-mode segmentation makes use of motion information for the ROI object between the current frame and one or more previous or subsequent frames of the video sequence. Hence, inter-mode segmentation is a relatively low-complexity segmentation mode.

ROI object segmentation system 14 may decide whether to perform intra-mode segmentation or inter-mode segmentation on a received frame based on one or more segmentation mode decision factors. Segmentation of on ROI object from the video frame without reference to motion information for the video frame, i.e., intra-mode segmentation, is applied when the high-complexity segmentation mode is selected. Segmentation of an ROI object from the video frame based on motion information for the video frame and a different video frame of the video sequence is applied when the low-complexity segmentation mode is selected.

The disclosed techniques further include a technique for generation of a foreground object during intra-mode segmentation by automatically selecting defined regions of a video frame located within a ROI object shape from a set of candidate regions within the entire frame. The disclosed techniques also include a technique for detecting moving regions within a foreground object during inter-mode segmentation based on background modeling and subtraction. Successfully detecting the moving foreground region may improve performance speed of ROI feature detection during inter-mode segmentation. The background modeling and subtraction technique is robust for noise and moving background regions. The technique is also substantially more efficient than moving object segmentation approaches employing computationally intensive motion estimation operations.

In the case of intra-mode segmentation, ROI object segmentation system 14 first detects a face mask within a video frame and then detects facial features, such as human eyes and a mouth, within the face mask. System 14 then performs feature verification based on geometric properties and shape characteristics of human facial features to remove false facial feature detections. After that, system 14 determines whether the frame includes more than one human face and separates the detected facial features into groups for the individual faces. Based on the geometric locations of the facial features and an ROI geometric model, the ROI object shape is approximated. For example, the ROI geometric model may comprise a human head and shoulder geometric model.

System 14 performs region growing on the video frame to generate a set of candidate regions. System 14 then generates a foreground object by selecting regions located within the resulting ROI object shape from the set of candidate regions for the entire frame. System 14 then determines if there is more than one foreground object and merges multiple foreground objects together to form a combined foreground object for an output image. Upon merging the multiple foreground objects, if applicable, system 14 sends the output image of the segmented frame to multimedia application 18, e.g., for personal identity detection in surveillance applications or preferential encoding in VT applications.

In the case of inter-mode segmentation, ROI object segmentation system 14 uses a background modeling and subtraction technique to take advantage of the temporal correlation of consecutive video frames of the video sequence. In this way, the technique described herein provides enhanced efficiency. System 14 classifies moving pixels within the ROI object between the current frame and the previous frame as foreground pixels. System 14 then generates a moving foreground region based on the foreground pixels. System 14 may then detect ROI features within the moving foreground region and the face mask and facial feature locations within the previous frame. In this way, system 14 reduces the computational complexity of performing region segmentation for each frame of the video sequence. System 14 then merges the moving foreground region with the foreground object of the previous frame to from an output image and sends the output image of the segmented frame to multimedia application 18.

ROI object segmentation system 14 may be implemented in hardware, software, firmware or any combination thereof. For example, various aspects of ROI object segmentation system 14 may be implemented within one or more digital signal processors (DSPs), microprocessors, application specific integrated circuits (ASICs), field programmable logic arrays (FPGAs), or any other equivalent integrated or discrete logic circuitry, as well as any combinations of such components. The term "processor" may generally refer to any of the foregoing logic circuitry, alone or in combination with other logic circuitry, and may refer to one or more of such processors. When implemented in software, the functionality ascribed to ROI object segmentation system 14 may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure.

FIGS. 2A and 2B are diagrams illustrating a definition of a ROI object 24 and a non-ROI area 25 within a video frame 22 of a video sequence. In the example of FIG. 2B, the ROI object is depicted as a head and shoulder ROI object 24. In other embodiments, the ROI object may comprise a rectangular ROI object or a non-rectangular ROI object that may have a rounded or irregular shape. ROI object 24 contains the face 26 of a person presented in video frame 22. The non-ROI area 25, i.e., the background, is highlighted by shading in FIG. 2B.

ROI object 24 may be automatically segmented from a video sequence by ROI object segmentation system 14 from FIG. 1. For VT applications, a communication device may preferentially encode ROI object 24 with an ROI-enabled encoder. In that case, ROI object 24 may encompass a portion of video frame 22 that contains the face 26 of a participant in a videoconference. Other examples include preferential encoding of the face of a person presenting information in streaming video, e.g., an informational video or a news or entertainment broadcast. The size, shape and position of ROI object 24 may be fixed or adjustable, and may be defined, described or adjusted in a variety of ways.

ROI object 24 permits a video sender to emphasize individual objects within a transmitted video frame 22, such as the face 26 of a person. Conversely, ROI object 24 permits a video recipient to more clearly view desired objects within a received video frame 22. In either case, face 26 within ROI object 24 is encoded with higher image quality relative to non-ROI areas 25 such as background regions of video frame 22. In this way, the user is able to more clearly view facial expressions, lip movement, eye movement, and the like. In some embodiments, ROI object also may be encoded not only with additional coding bits, but also enhanced error detection and resiliency.

Figure 3:
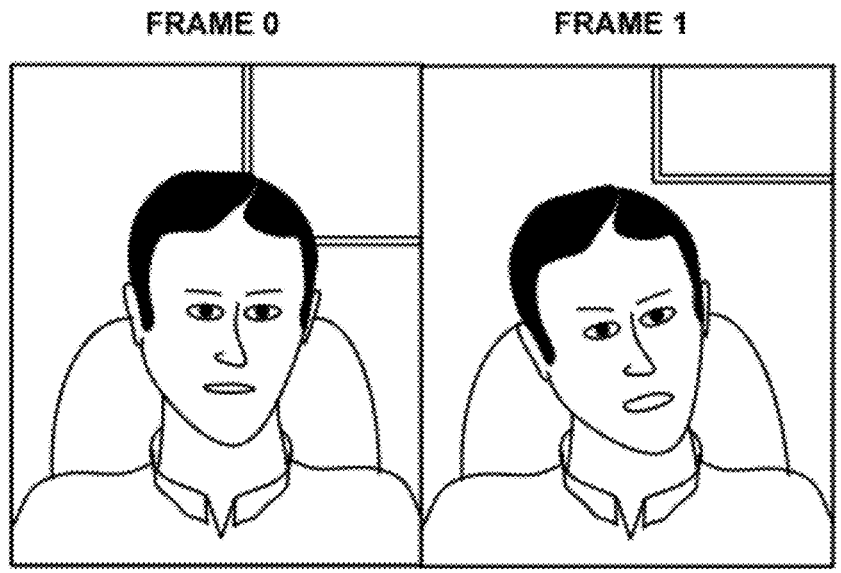
FIG. 3 illustrates changes in object movement/rotation and shape deformation for an object presented within an ROI object of a video sequence.
Figure 4:
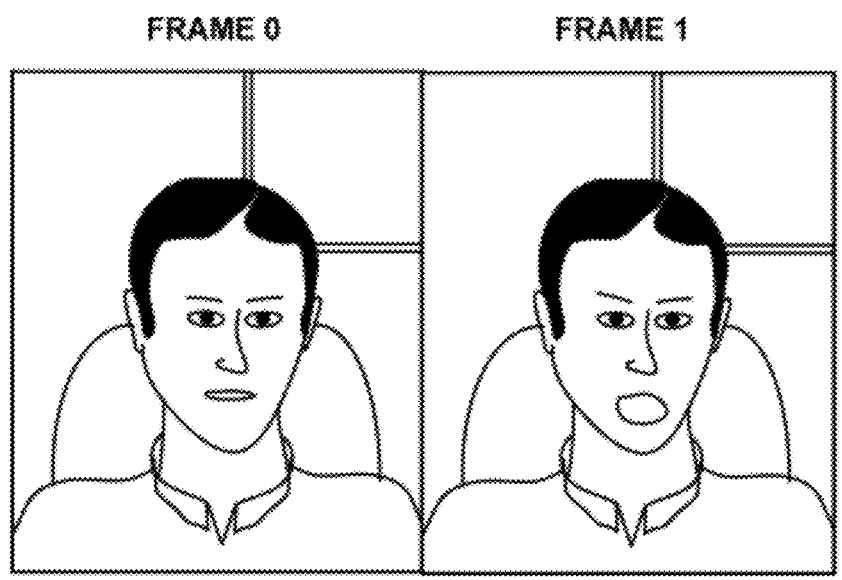
FIG. 4 illustrates changes in facial expression for a person within an ROI object of a video sequence.

FIG. 3 illustrates changes in object movement/rotation and shape deformation for an object presented within an ROI object of a video sequence. In particular, the head of the person pictured in Frames 0 and 1 of FIG. 3 changes its position significantly. In the example of FIG. 3, the person's head tilts in Frame 1 relative to Frame 0. FIG. 4 illustrates changes in facial expression for a person within an ROI object of a video sequence. In particular, the mouth of the person pictured in Frames 0 and 1 transitions from a substantially closed position to a wide open position. Hence, FIGS. 3 and 4 represent cases of large amounts of movement in the ROI object of a video sequence.

Figure 5A:
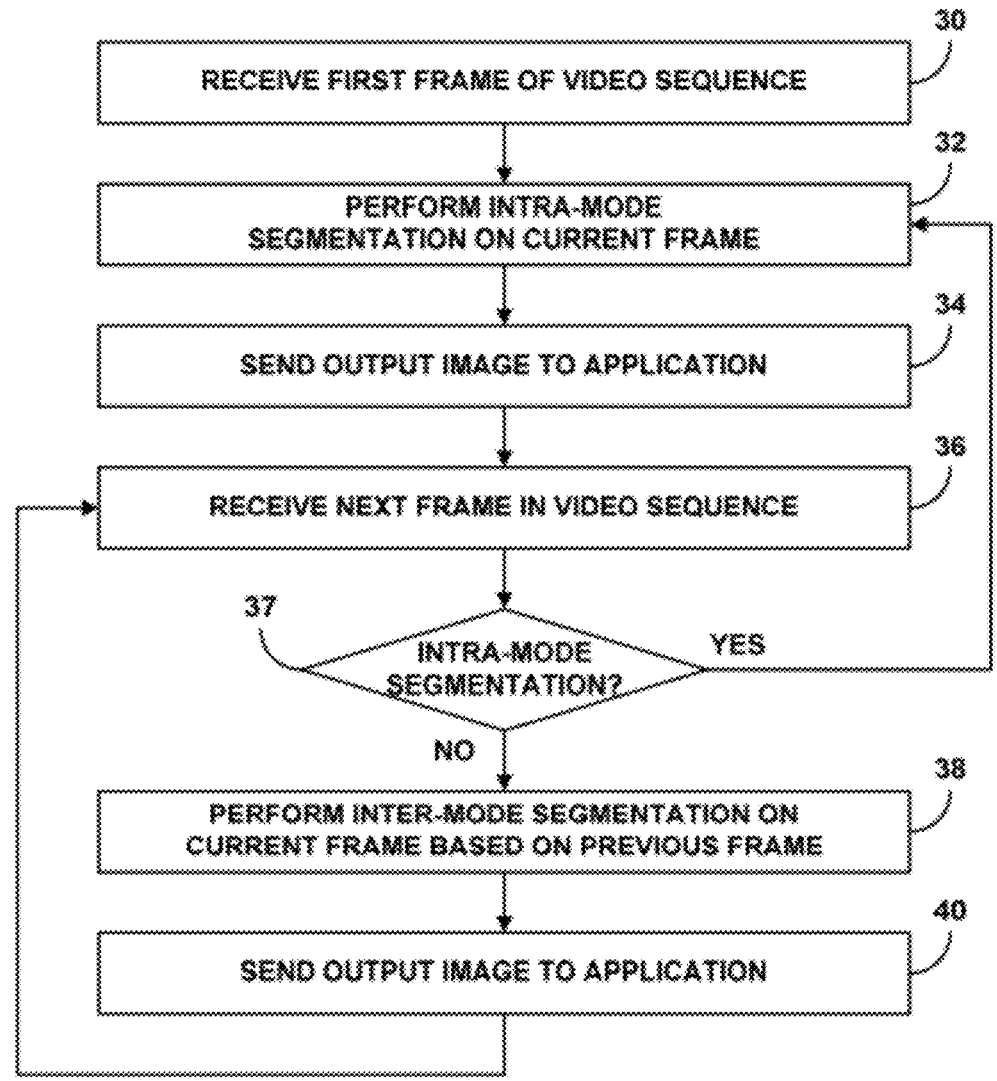
FIG. 5A is a flow diagram that illustrates an exemplary operation of the ROI object segmentation system from FIG. 1.

FIG. 5A is a flow diagram that illustrates an exemplary operation of ROI object segmentation system 14 from FIG. 1. ROI object segmentation system 14 implements techniques for automatic segmentation of a ROI object from a video sequence. As described above, ROI object segmentation system 14 supports both intra-mode segmentation and inter-mode segmentation to process a video sequence.

ROI object segmentation system 14 receives a first frame of a video sequence from video source 12 (30). ROI object segmentation system 14 performs intra-mode segmentation on the received frame (32). Intra-mode segmentation processes the current frame of the video sequence independently from other frames in the video sequence. In the case of intra-mode segmentation, ROI object segmentation system 14 uses no ROI object motion information. While performing intra-mode segmentation, ROI object segmentation system 14 stores the received frame of the video sequence in video memory 16. The ROI object segmentation system 14 then sends an output image of the segmented frame to multimedia application 18 (34).

ROI object segmentation system 14 receives the next frame of the video sequence from video source 12 (36). System 14 then makes a mode decision to determine whether to perform intra-mode segmentation or inter-mode segmentation on the received frame (37). The mode decision may be based on one or more segmentation mode decision factors. For example, system 14 may decide which segmentation mode to perform on the received frame based on segmentation mode decision factors such as computational complexity of the received frame, a desired quality of segmentation for the received frame, an amount of similarity between the received frame and the previous frame, an amount of motion activity between the received frame and the previous frame, the segmentation mode used for the previous frame, and a number of frames segmented since the last intra-mode process. In other embodiments, the segmentation mode decision may be based on additional segmentation mode decision factors.

When system 14 decides to not perform intra-mode segmentation (no branch of 37), ROI object segmentation system 14 performs inter-mode segmentation on the received frame based on the previous frame (38). In this case, ROI object segmentation system 14 retrieves motion information from the previous frame of the video sequence, e.g., from video memory 16, and uses motion information for the ROI object between the current frame and the previous frame. While performing inter-mode segmentation, ROI object segmentation system 14 stores the received frame of the video sequence in video memory 16. The ROI object segmentation system 14 then sends an output image of the segmented frame to multimedia application 18 (40).

ROI object segmentation system 14 continues to receive frames of the video sequence from video source 12. When system 14 decides to perform inter-mode segmentation (yes branch of 37), ROI segmentation system 14 again performs intra-mode segmentation on the received frame (32). Therefore, ROI object segmentation system 14 performs intra-mode segmentation on some of the frames of the video sequence received from video source 12 and performs inter-mode segmentation on the other frames of the video sequence.

Figure 5B:
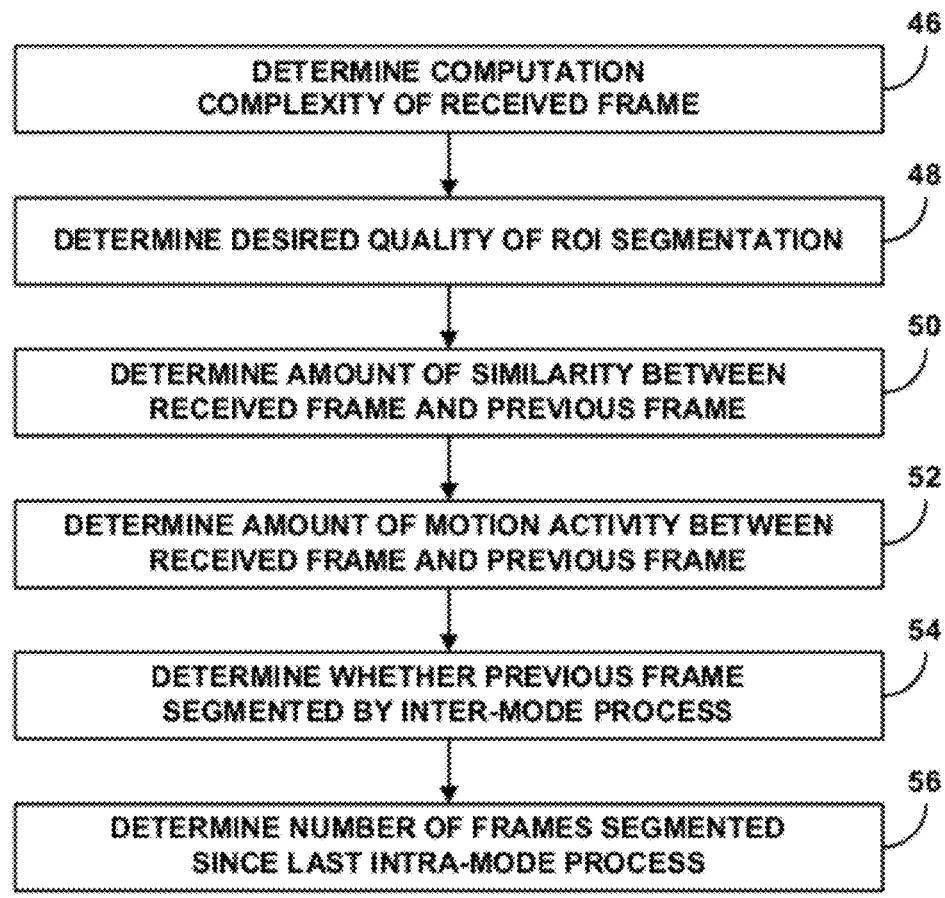
FIG. 5B is a flowchart illustrating the segmentation mode decision from FIG. 5A in greater detail.

FIG. 5B is a flowchart illustrating the segmentation mode decision (step 37) from FIG. 5A in greater detail. ROI object segmentation system 14 may make the segmentation mode decision based on one or more segmentation mode decision factors. System 14 may perform one or more of the steps illustrated in FIG. 5 to determine the mode of segmentation to perform on a received frame. In some embodiments, system 14 may perform the steps individually or combine one or more of the steps in any order. In other embodiments, ROI object segmentation system 14 may consider additional segmentation mode decision factors when deciding whether to perform intra-mode segmentation or inter-mode segmentation on the received frame.

System 14 may determine a computational complexity of the received frame (46). For example, system 14 may examine the received frame to determine a number of ROI feature candidates included in the received frame. If the frame includes a large number of ROI features, the received frame may be too complex for the inter-mode segmentation process to accurately segment the ROI object from the frame. Therefore, system 14 may decide to perform intra-mode segmentation when the computational complexity is above a pre-determined level in order to process the high-complexity video frame. System 14 may also determine a desired quality of segmentation from an end-user (48). For example, system 14 may perform intra-mode segmentation on the received frame if an end-user of a video communication device that implements ROI segmentation system 14 requests a quality of segmentation above a pre-determined level for the received video frame. Conversely, system 14 may perform inter-mode segmentation on the received frame if the end-user requests a quality of segmentation below the pre-determined level for the received video frame.

In addition, system 14 may determine an amount of similarity between the received frame and the previous frame (50). For example, system 14 may compare the received frame with the previous frame to determine whether an amount of similarity between the color histograms of the two frames is above a pre-determined level. Large color changes between the two frames may indicate a scene change. In this case, system 14 may perform intra-mode segmentation in order to segment potential new ROI objects within the received frame. If the color histogram remains substantially similar between the two frames, system 14 may perform inter-mode segmentation.

System 14 may determine an amount of motion activity between the received frame and the previous frame (52). For example, system 14 may compare the received frame with the previous frame to determine whether an amount of movement between the locations of the ROI objects within the frames is above a pre-determined level. If ROI objects occupy substantially different areas or locations within the two frames, system 14 may perform intra-mode segmentation. If ROI objects occupy substantially the same area or location within the two frames, system 14 may perform inter-mode segmentation.

In the above steps, the ROI segmentation processes of the video sequence may include any number of intra-mode segmentation and inter-mode segmentation performed on video frames of the video sequence in any order. For example, intra-mode segmentation may be represented as 0 and inter-mode segmentation may be represented as 1. The intra-mode (0) and inter-mode status (1) of a set of frames in an exemplary video sequence segmentation may be represented as: 0 0 1 1 0 1 1 1 0. In this case, the segmentation mode decision is based purely on properties of the received frame or between the received frame and the previous frame.

System 14 may also determine which segmentation mode to perform on the received frame based on the segmentation mode used to segment the previous frame. System 14 may determine whether the previous frame was segmented by the intra-mode process (54). If the previous frame was segmented by the intra-mode process, system 14 may decide to segment the received frame by the inter-mode process. In this step, the ROI segmentation processes of the video sequence may include any number of intra-mode segmentation and inter-mode segmentation performed on video frames of the video sequence such that inter-mode segmentation always follows intra-mode segmentation. The intra-mode (0) and inter-mode status (1) of a set of frames in an exemplary video sequence segmentation may be represented as: 0 1 1 0 1 1 1 1 0 1. In this case, the segmentation mode decision is based purely on the segmentation mode of the previous frame.

Furthermore, system 14 may determine a number of frames segmented since the last intra-mode segmented frame (56). For example, system 14 may decide to perform intra-mode segmentation on a periodic basis, such as every N frames. In some cases the Nth frame may comprise the $10^{th}$ frame. In other embodiments, N may be equal to more or less than 10 frames. In this step, the ROI segmentation processes of the video sequence may include any number of intra-mode segmentation and inter-mode segmentation performed on video frames of the video sequence such that intra-mode segmentation is performed periodically. The intra-mode (0) and inter-mode status (1) of a set of frames in an exemplary video sequence segmentation may be represented as: 0 1 1 1 0 1 1 1 0 1. In this case, the segmentation mode decision is based on performing intra-mode segmentation every $4^{th}$ frame.

Figure 6:
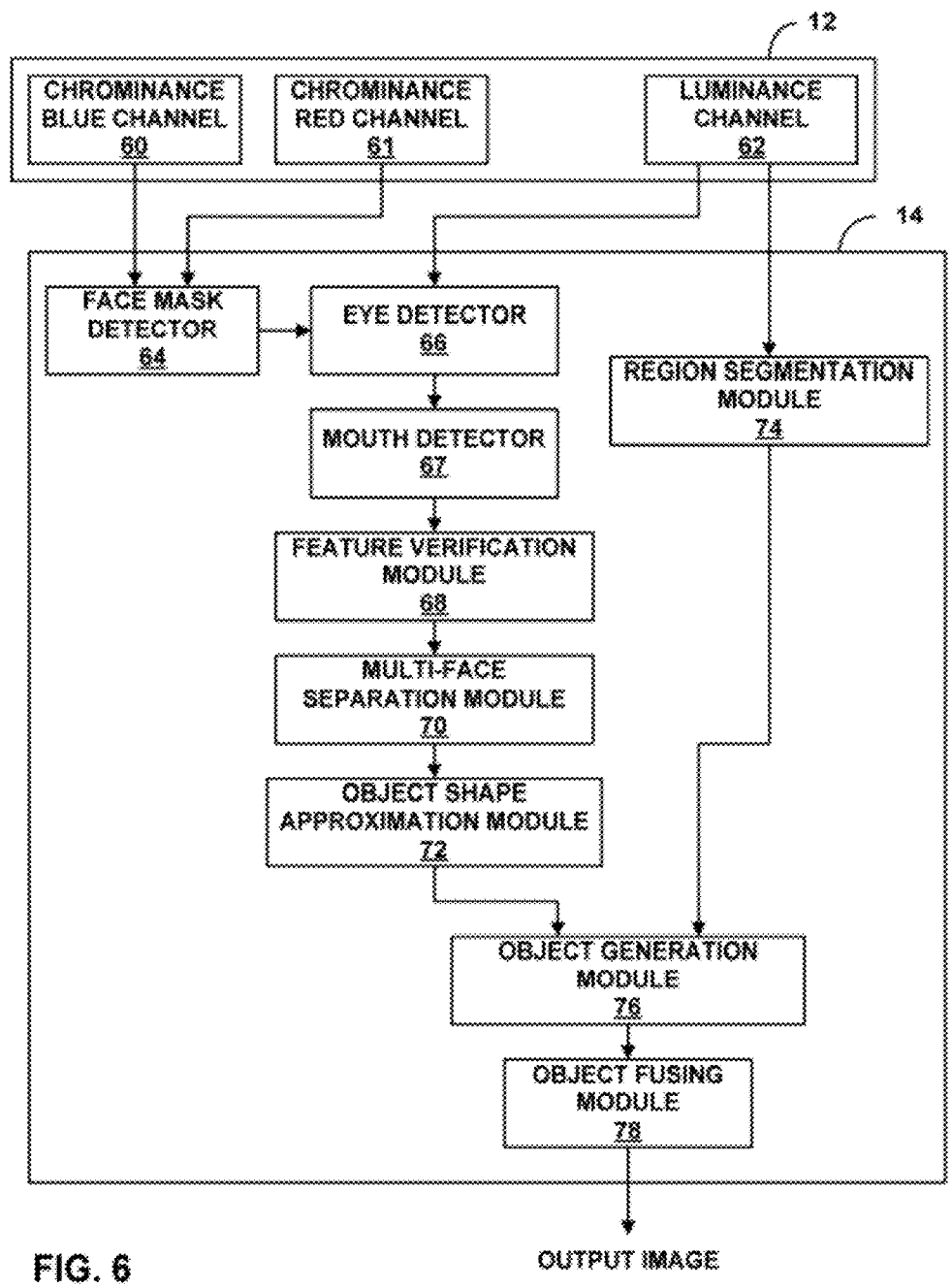
FIG. 6 is a block diagram illustrating a ROI object segmentation system when performing intra-mode segmentation on a frame of a video sequence received from a video source.

FIG. 6 is a block diagram illustrating ROI object segmentation system 14 when performing intra-mode segmentation on a frame of a video sequence received from video source 12. In this case, ROI object segmentation system 14 processes the frame of the video sequence independently from other frames of the video sequence and without motion information. FIGS. 7-13 are screen shots illustrating exemplary results of the techniques implemented by ROI object segmentation system 14 during intra-mode segmentation.

In the embodiment illustrated in FIG. 6, video source 12 includes a chrominance blue channel (Cb) 60, a chrominance red channel (Cr) 61, and a luminance channel (Y) 62. ROI object segmentation system 14 implements techniques to automatically segment a ROI object, such as a human head and shoulder area, from a video frame of a video sequence received from video source 12. The disclosed techniques include a hybrid technique that combines feature-based and model-based detection with region segmentation during intra-mode segmentation.

Figure 7:
FIGS. 7-13 are screen shots illustrating exemplary results of the techniques implemented by a ROI object segmentation system during intra-mode segmentation.

ROI object segmentation system 14 includes a face mask detector 64 that detects skin-color regions within a video frame based on blue and red channel chrominance values received from chrominance blue channel 60 and chrominance red channel 61 of video source 12. Face mask detector 64 then classifies pixels of the detected skin-color regions as facial pixels. In this way, face mask detector 64 may obtain a face mask by removing pixels within the received frame that are not facial pixels. After the face mask is obtained, face mask detector 64 uses mathematical morphological operations of dilation and erosion to remove noise and holes within the face mask due to the facial features, such as eye and mouth regions. FIG. 7 illustrates an example of a quick face mask detection on a frame of a standard "Mother and Daughter" video test sequence.

Typically, face mask detector 64 uses a skin-color map that can identify skin-color regions within the video frame by the presence of a certain set of chrominance values narrowly and consistently distributed in the YCbCr color space. The skin-color map is robust against different types of skin color. Skin colors of human races are perceived differently mainly due to the darkness or fairness of the skin. In other words, the skin color is characterized by the difference in the brightness of the color, which is governed by Y but not Cr or Cb. Therefore, an effective skin-color map can be achieved based only on the Cr and Cb components of the received frame. Face mask detector 64 may utilize a CbCr skin-color map having a range of Cr∈ [133, 173] and Cb∈ [77,127] to detect the skin-color regions within the received video frame. The Cr and Cb ranges should not be considered limiting, however, and face mask detector 64 may utilize a skin-color map having different Cr and Cb ranges.

In some cases, face mask detector 64 may be unable to exclusively obtain a human face. As illustrated in FIG. 7, the clothing regions of the mother and the daughter within the frame appear to have tones similar to those defined by the skin-tone map. Therefore, face mask detector 64 may falsely select the clothing regions as part of the face mask. The quick face mask detection step described herein removes some non-face regions within the frame, but further processing may be needed to obtain and verify exact face regions.

System 14 also includes an eye detector 66 and a mouth detector 67 that detect facial feature candidates within the face mask, and a feature verification module 68 that selects facial features from the eye and mouth candidates. Facial filters are typically built based on common knowledge of human faces and their features, such as the elliptical shape of a facial region and overall spatial relationship constraints among the facial features. Therefore, locating these facial features is useful in deriving an approximate face location within a video frame.

Eye detector 66 detects eye feature candidates within the face mask obtained by face mask detector 64. Eye detector 66 detects the eye feature candidates based on two observations. First, the chrominance components around eyes normally contain high Cb and low Cr values. Therefore, eye detector 66 may construct a chrominance eye map of the frame based on equation (1) given below.

$$C = \frac{Cb^2 + (255 - Cr)^2 + (Cb/Cr)}{3} \quad (1)$$

Figure 8A:
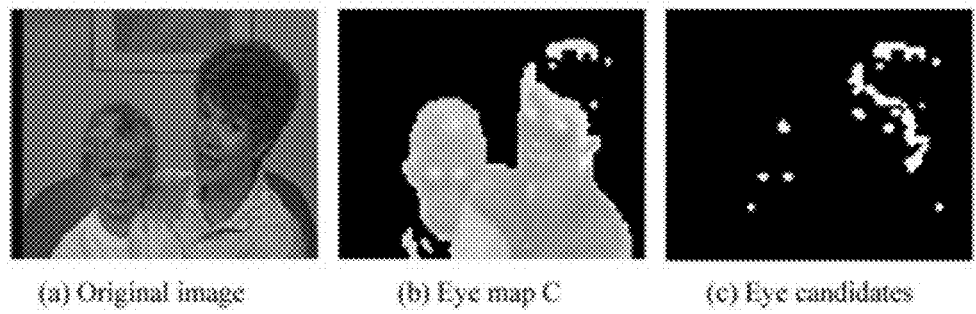

Once the chrominance eye map is obtained, eye detector 66 may apply a threshold to the chrominance (C) eye map value of each pixel within the eye map to locate the brightest regions within the eye map for eye candidates. Eye detector 66 then applies morphological operations to merge substantially close brightest regions into single eye candidates. FIG. 8A illustrates an example of eye detection within a chrominance eye map of the frame of the "Mother and Daughter" video test sequence.

Second, eyes usually contain both dark and bright pixels in the luminance component. Therefore, grayscale morphological operators may be used to emphasize brighter and darker pixels in the luminance component around eye regions. Eye detector 66 may construct a luminance eye map of the frame based on equation (2) given below.

$$L = \frac{\text{Dilation}(Y)}{\text{Erosion}(Y) + 1} \quad (2)$$

Figure 8B:
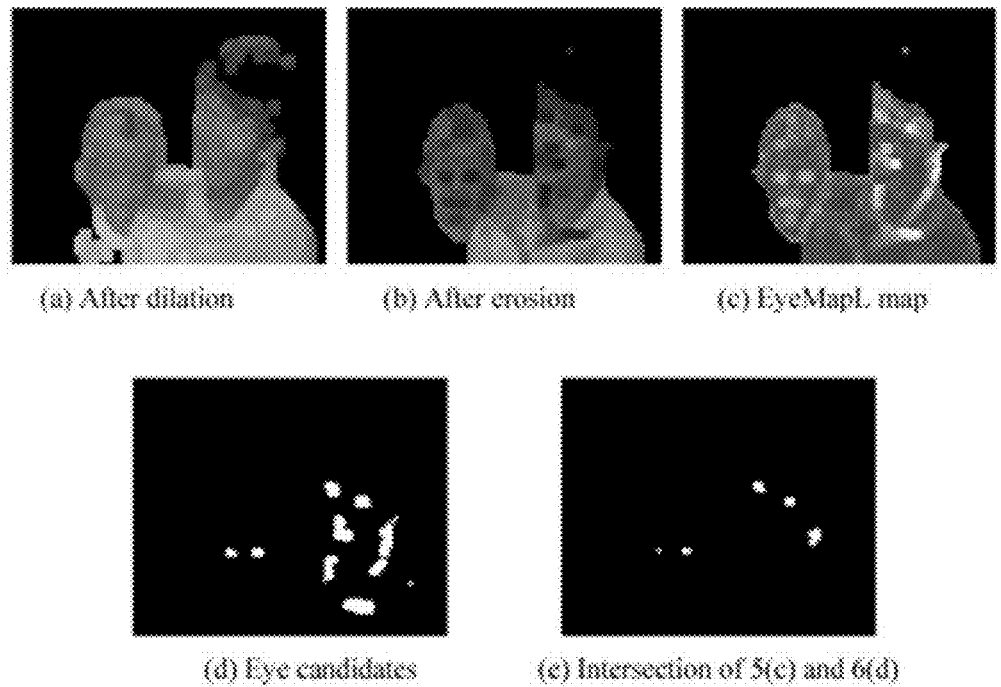

Once the luminance eye map is obtained, eye detector 66 may apply a threshold to the luminance (L) eye map value of each pixel within the eye map to locate the brightest regions within the eye map for eye candidates. Eye detector 66 then applies morphological operations to merge substantially close brightest regions into single eye candidates. FIG. 8B illustrates an example of eye detection within a luminance eye map of the frame of the "Mother and Daughter" video test sequence.

Eye detector 66 combines the eye candidates detected within the chrominance eye map (shown in FIG. 8A) with the eye candidates detected within the luminance eye map (shown in FIG. 8B) to find final eye candidates within the face mask. In some cases, however, the final eye candidates may still contain incorrect eye candidates. These extraneous eye candidates may be removed later during a feature verification process.

Mouth detector 67 detects mouth feature candidates within the face mask obtained by face mask detector 64. Typically, the color of a mouth region contains a stronger red component and a weaker blue component than other facial regions. Therefore, the chrominance component Cr should be greater than the chrominance component Cb in the mouth region. However, the mouth region has a relatively low response in the Cr/Cb feature, but has a relatively high response in the $Cr^2$ feature. Mouth detector 67 may construct a mouth map of the frame based on equations (3) and (4) given below.

$$M = Cr^2 \left( Cr^2 - \lambda \frac{Cr}{Cb} \right)^2, \text{ where} \quad (3)$$

-continued $$\lambda = 0.95 \frac{\sum_{(x,y) \in SkinMask} Cr(x, y)^2}{\sum_{(x,y) \in SkinMask} \frac{Cr(x, y)}{Cb(x, y)}} \quad (4)$$

Figure 9:
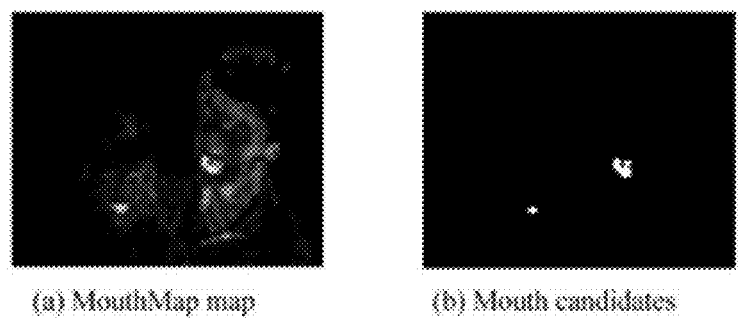

Once the mouth map is obtained, mouth detector 67 may apply a threshold to the mouth (M) value of each pixel within the mouth map to locate the brightest regions within the mouth map for mouth candidates. Mouth detector 67 then applies morphological operations to merge substantially close brightest regions into single mouth candidates. FIG. 9 illustrates an example of mouth detection within a mouth map of the frame of the "Mother and Daughter" video test sequence.

Feature verification module 68 verifies the facial feature candidates detected within the face mask by eye detector 66 and mouth detector 67 to select the correct facial features from the eye and mouth candidates. Feature verification module 68 ensures a robust ROI feature detection process. Although the eye and mouth map processes described above are effective in classifying eye and mouth regions, some erroneous classifications may still result in false facial feature detections. Feature verification module 68 performs three verification steps to verify the facial feature candidates within the face mask and remove any false facial feature detections.

Figure 10A:

First, in terms of facial topography, it is observed that facial features are typically located in "valley" regions, i.e., recessed regions, which are characterized by high intensity contrast inside the region. Therefore, feature verification module 68 identifies the valley regions by performing gray-scale-close and dilation morphological operations. Feature verification module 68 then compares locations of the facial feature candidates within the frame to locations of the valley regions within the frame. If a facial feature candidate does not at least partially overlap an area of a detected valley region, feature verification module 68 will remove the facial feature candidate from consideration. Hence, to retain a facial feature candidate, feature verification module 68 requires correlation of the feature with one of the identified valley regions. FIG. 10A illustrates valley regions identified within the frame of the "Mother and Daughter" video sequence.

Figure 10B:
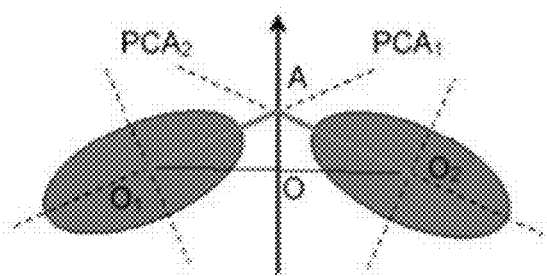

Second, feature verification module 68 verifies the eye feature candidates based on inherent properties of eye pairs, such as symmetric location within the frame and shape characteristics. FIG. 10B illustrates inherent properties of an eye pair with respective centroids $O_1$ and $O_2$. For example, the two eyes are symmetric with respect to a major axis, A, of a face such that $|AO_1|=|AO_2|$, both eyes have a similar area, and both eyes have a similar shape that can be compared by projecting to the axis OA. The two eyes are also symmetric with respect to respective PCA (Principle Component Analysis) axes, $PCA_1$ and $PCA_2$. In addition, eyebrows can typically be detected above the two eyes.

Feature verification module 68 may utilize a weighted score-system to verify the eye feature candidates within the face mask. In this case, feature verification module 68 checks a number of criteria based on eye pair properties and provides a score for each of the criteria. For example, feature verification module 68 determines whether the eye centroid location is inside a valley region. Next, feature verification module 68 determines whether the locations of the eye centroid and the detected iris are substantially close. The iris location may be found by projecting an intensity value in an eye to horizontal and vertical axes and identifying the point that corresponds to a minimum accumulated total intensity value. Feature verification module 68 then determines whether an eyebrow is found above the eye. Next, feature verification module 68 determines whether a PCA axis of the eye is within a range of reasonable directions, which may be determined from empirical characterization of typical human eye pairs. Feature verification module 68 then determines whether the eye has an eye pair within a reasonable distance, which again may be determined from empirical characterization. Next, feature verification module 68 determines whether the pair of eyes has symmetric PCA axes according to the axis OA. Feature verification module 68 then determines whether the pair of eyes has a symmetric shape according to the axis OA.

Feature verification module 68 accumulates scores from each criterion described above in order to select the correct facial features from the candidates and construct a facial feature map of the video frame. The scores determined for the various individual criteria may be equally weighted, or differently weighted to emphasize one or more criteria over other criteria. Feature verification module 68 identifies false detections as those facial feature candidates with cumulative scores below a preset threshold value. Feature verification module 68 then removes these falsely detected facial feature candidates.

Figure 10C:
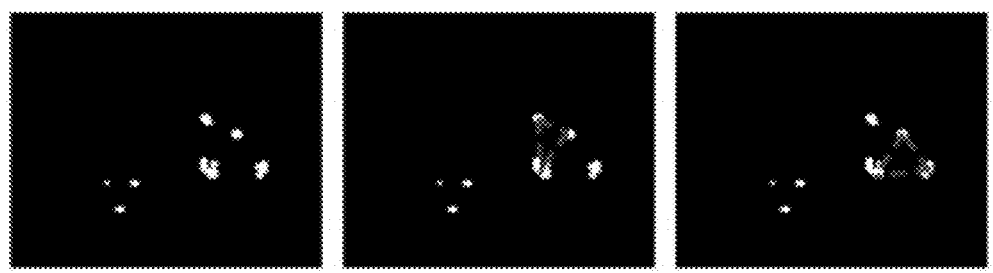

Third, feature verification module 68 verifies eye-mouth triangles from every possible combination of two eye candidates and one mouth candidate within the facial feature map. Feature verification module 68 first reviews the geometry and orientation of the eye-mouth triangles and removes unreasonable eye-mouth triangles from further consideration. Eye-mouth triangles deemed unreasonable are those that do not substantially match a range of empirically determined eye-mouth triangle geometries for typical humans. FIG. 10C illustrates two possible eye-mouth triangles (dashed-lines) within the facial feature map of the frame of the "Mother and Daughter" video sequence. Feature verification module 68 then uses a template to verify gradient characteristics of the eye-mouth triangle area. Because the human face is a three-dimensional (3D) object, the luminance throughout the facial region tends to be non-uniform. A legitimate eye-mouth triangle area should contain a nose, which makes the gradient information more complicated than in other facial areas, such as a chin. Using the more distinctive gradient information available from the eye-mouth triangle area, feature verification module 68 may select the correct eye and mouth candidates for a face in the video frame.

System 14 also includes a multi-face separation module 70 that separates the facial features selected by feature verification module 68 into groups for individual faces within the frame. In video sequences, such as the Mother and Daughter sequence, that include more than one face in a video frame, multi-face separation module 70 separates the sets of eye and mouth candidates into groups corresponding to the different faces. The difficulties of this task are three-fold. First, the total number of faces included within the video frame is unknown. Second, some facial features may not have been detected within the video frame. Third, an exhaustive check of all the potential facial feature group combinations has exponential computational complexity. By simplifying the problem to the task of pairing eyes with a mouth, the original problem can be mapped into a graph theory problem, which has polynomial computational complexity. The resulting reduction in computational complexity may be highly desirable for many applications, including mobile applications with limited power and processing resources and other applications requiring fast and possibly real-time results.

Applying graph theory, multi-face separation module 70 considers a bipartite graph G=(V,E) with vertices set V={mouth}+{eye pairs} and edge set E={$(v_i,v_j)$}, where $v_i$ and $v_j$ belong to different sets and the distance between the node $v_i$ and $v_j$ is within a reasonable range. If a matching S is defined as a subset of E such that no two edges in S are incident to the same vertex or directly connected vertices, then the problem becomes a maximum matching scheme problem. In this way, the multi-face separation process is a variant of the original maximum matching scheme problem, because in the original maximum matching scheme problem definition, the constraint on the matching only requires that no two edges in S are incident to the same vertex.

It is important to observe the possibility of converting the multi-face separation problem into the original maximum matching scheme problem. If an edge set E'={$(v_i,v_j)$}, where there exits $v_k$ such that $(v_i,v_k) \in E$, $(v_j,v_k) \in E$ but $(v_i,v_j) \notin E$, is defined after expanding the edge set from E to E∪E', the problem becomes the original maximum matching scheme problem except that an additional constraint must be included such that the result matches must be a subset of E instead of E∪E'. Therefore, multi-face separation module 70 can solve the multi-face separation problem in polynomial time complexity.

System 14 includes an object shape approximation module 72 that approximates an ROI object shape for each face within the video frame based on a ROI object geometric model. For example, a ROI object shape may be approximated within the frame based on a human head and shoulder geometric model. After feature verification module 68 obtains the correct eye-mouth triangle for a face, object shape approximation module 72 may build an ROI object shape, e.g., a head and shoulder model, based on the geometric relationship between the nodes of the eye-mouth triangle.

Figure 11:
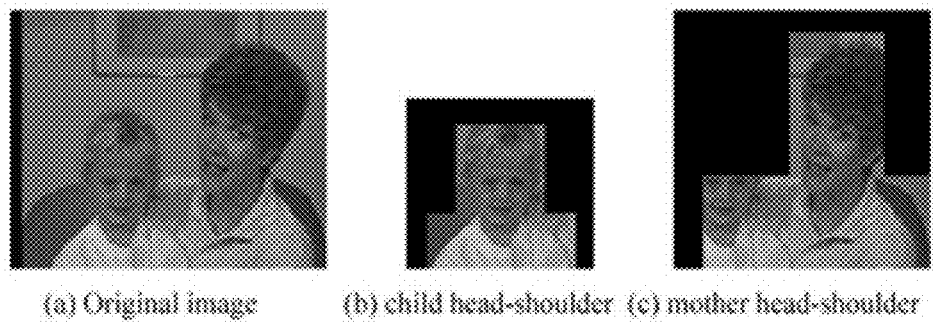

In order to speed up performance during intra-mode segmentation, object shape approximation module 72 may use a simple rectangular model to approximate the ROI object shape, such as a human head and shoulder object shape. For video sequences that include more than one face in a video frame, after multi-face separation module 70 separates the eyes and mouth candidates into groups for the different faces, object shape approximation module 72 approximates a ROI object shape for each of the faces based on the separate eye-mouth triangles. For example, object shape approximation module 72 may approximate a head and shoulder object shape for each face included within the video frame. FIG. 11 illustrates head and shoulder object shapes defined for each face within the frame of the "Mother and Daughter" video test sequence.

Figure 12:
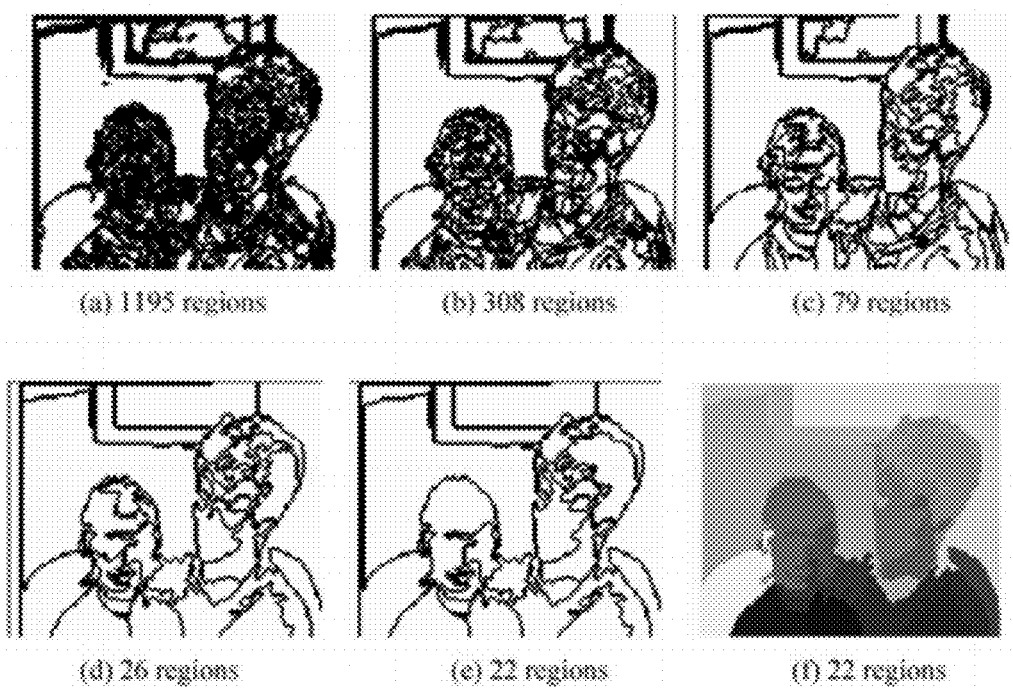

ROI object segmentation system 14 also includes a region segmentation module 74 that performs split-and-merge region growing on the entire frame. Region segmentation module 74 divides the original frame into multiple homogeneous candidate regions. When performing split-and-merge region growing, region segmentation module 74 classifies relationships between neighboring pixels within the video frame into a similar class and a dissimilar class. Region similarity may be determined based on the average pixel intensity value in the region. Region segmentation module 74 then clusters connected similar pixels into small regions and continues to merge these regions to form a minimum number of candidate regions. FIG. 12 illustrates the region growing process where the video frame is initially split into 1195 regions, and then the regions are merged together until 22 candidate regions are generated.

System 14 further includes an object generation module 76 that automatically selects regions of the frame located within the approximated ROI object shape from the candidate regions within the entire frame. The selected regions may be considered foreground regions and unselected regions may be considered background regions. Object generation module 76 then generates a foreground object based on the foreground regions.

Object generation module 76 only selects regions from the set of candidate regions generated by region segmentation module 74 that are located within the ROI object shape approximated by object shape approximation module 72. As described above, the ROI object shape may comprise a rectangular area that contains a ROI object, e.g., a face, and the size of the ROI object shape may be estimated based on the selected eye-mouth triangle for the face. In this way, further processing may be conducted within the ROI object shape instead of within the entire video frame.

Object generation module 76 examines each of the candidate regions within the video frame generated by region segmentation module 74 and determines whether the regions are located within the ROI object shape. Object generation module 76 may consider regions that have more than a predefined percentage, e.g., 60%, of total pixels within the ROI object shape to be foreground regions. Object generation module 76 may then consider the remaining regions within the video frame that have less than the predefined percentage of total pixels within the ROI object shape to be background regions. In this way, object generation module 76 generates a foreground object from the foreground regions within the video frame.

Figure 13:
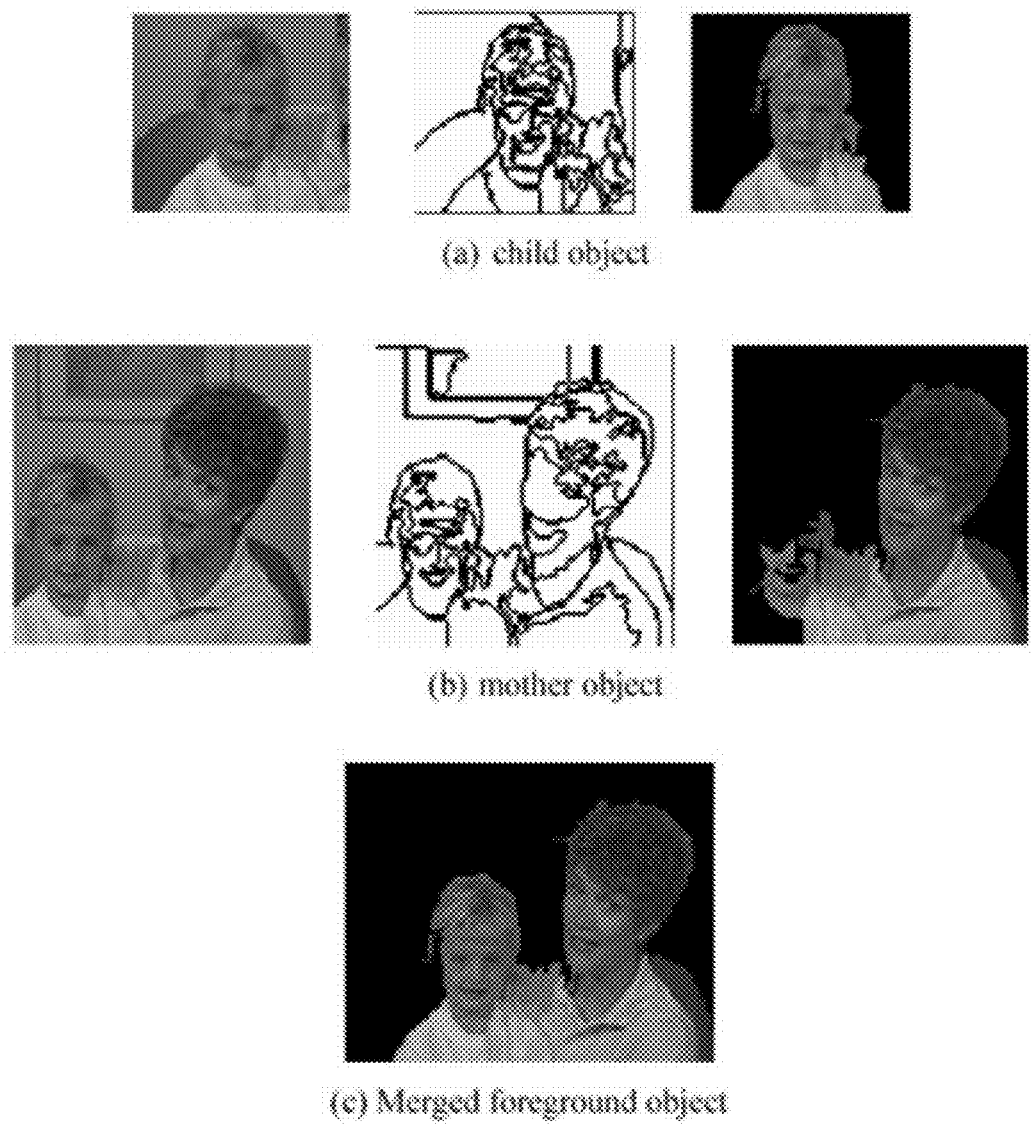

Finally, system 14 includes an object fusing module 78 that merges multiple foreground objects within the frame into a final output image. For video sequences that include more than one foreground object, object fusing module 78 merges the foreground objects to form an output image. FIG. 13 illustrates generation of a foreground object for each of the faces within the video frame and generation of an output image by merging the two foreground objects. ROI object segmentation system 14 may then send the output image of the segmented frame to multimedia application 18.

Figure 14:
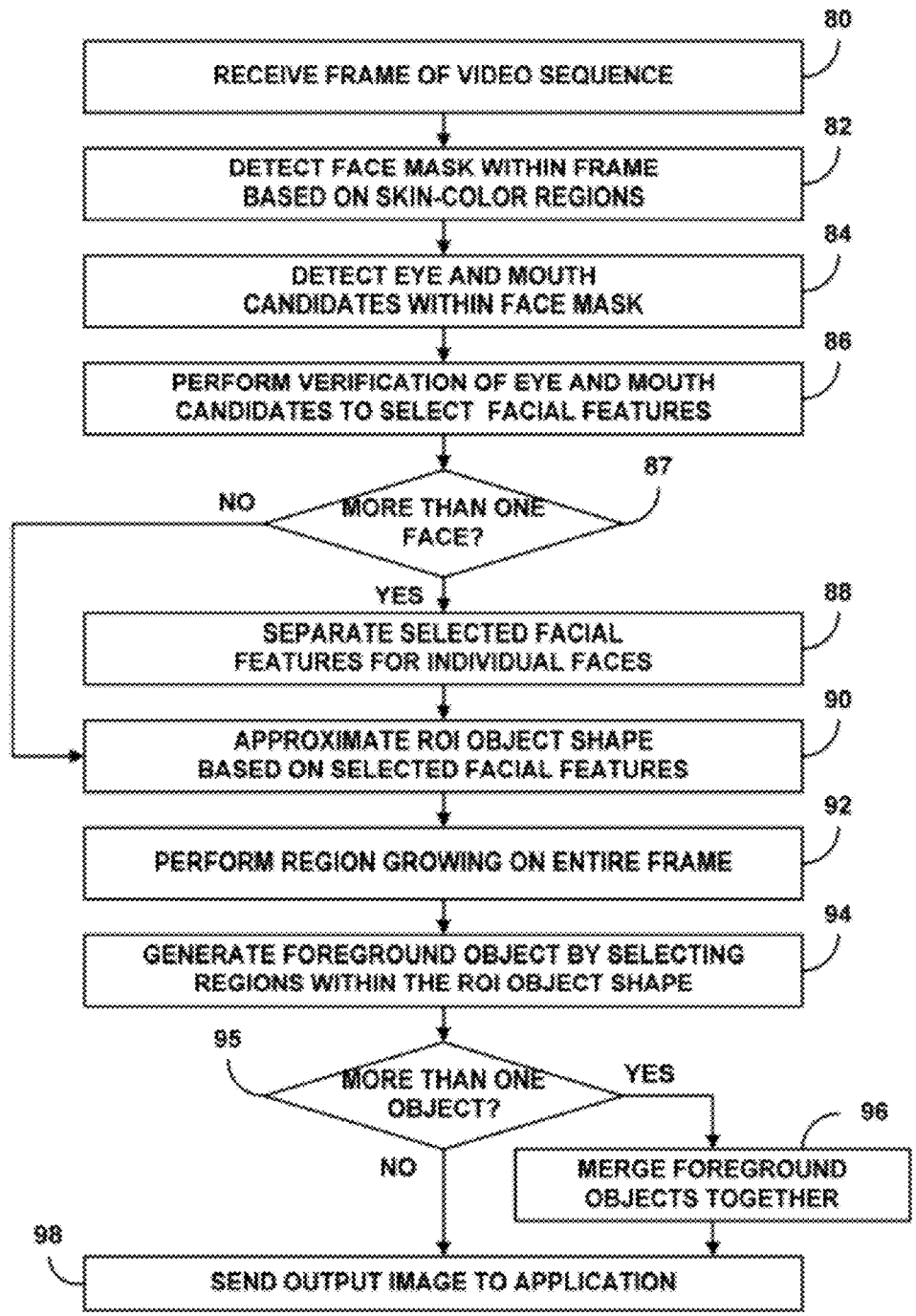
FIG. 14 is a flow diagram illustrating operation of a ROI object segmentation system performing intra-mode segmentation.

FIG. 14 is a flow diagram illustrating operation of ROI object segmentation system 14 performing intra-mode segmentation. The operation will be described herein in reference to ROI object segmentation system 14 illustrated in FIG. 7. ROI object segmentation system 14 receives a frame of a video sequence from video source 12 (80). In the case of intra-mode segmentation, ROI object segmentation system 14 processes the received frame of the video sequence independently from other frames of the video sequence and without motion information.

Face mask detector 64 detects a face mask within the received frame based on skin-color regions identified within the video frame (82). Face mask detector 64 then classifies pixels of the identified skin-color regions as facial pixels. In this way, face mask detector 64 may obtain the face mask by removing pixels within the received frame that are not facial pixels.

Eye detector 66 and mouth detector 67 then detect facial feature candidates within the face mask (84). Eye detector 66 may detect eye feature candidates based on chrominance values and luminance values of pixels within the face mask. Mount detector 67 may detect mouth feature candidates based on chrominance values of pixels within the face mask. Feature verification module 68 performs verification of the facial feature candidates detected by eye detector 66 and mouth detector 67 to select the correct facial features (86).

ROI object segmentation system 14 then determines whether or not the received video frame includes more than one face (87). If the video frame does include more than one face, multi-face separation module 70 separates the facial features selected by feature verification module 68 into groups for the individual faces included in the frame (88). Object shape approximation module 72 then approximates a ROI object shape for each face within the video frame based on a ROI object geometric model defined by the facial features selected by feature verification module 68 (90). For example, a head and shoulder object shape may be approximated for each face within the frame based on the location of the correct eye-mouth triangle.

Region segmentation module 74 performs split-and-merge region growing on the entire frame (92). Region segmentation module 74 divides the original frame into multiple homogeneous candidate regions. Object generation module 76 then automatically selects regions of the frame located within the approximated ROI object shape from the candidate regions within the entire frame. The selected regions may be considered foreground regions and unselected regions may be considered background regions. Object generation module 76 then generates a foreground object based on the foreground regions (94).

ROI object segmentation system 14 determines whether the video frame includes more than one foreground object (95). When the video frame includes more than one foreground object, object fusing module 78 merges the foreground objects within the frame into a final output image (96). ROI object segmentation system 14 then sends the output image of the segmented frame to multimedia application 18 (98).

Figure 15:
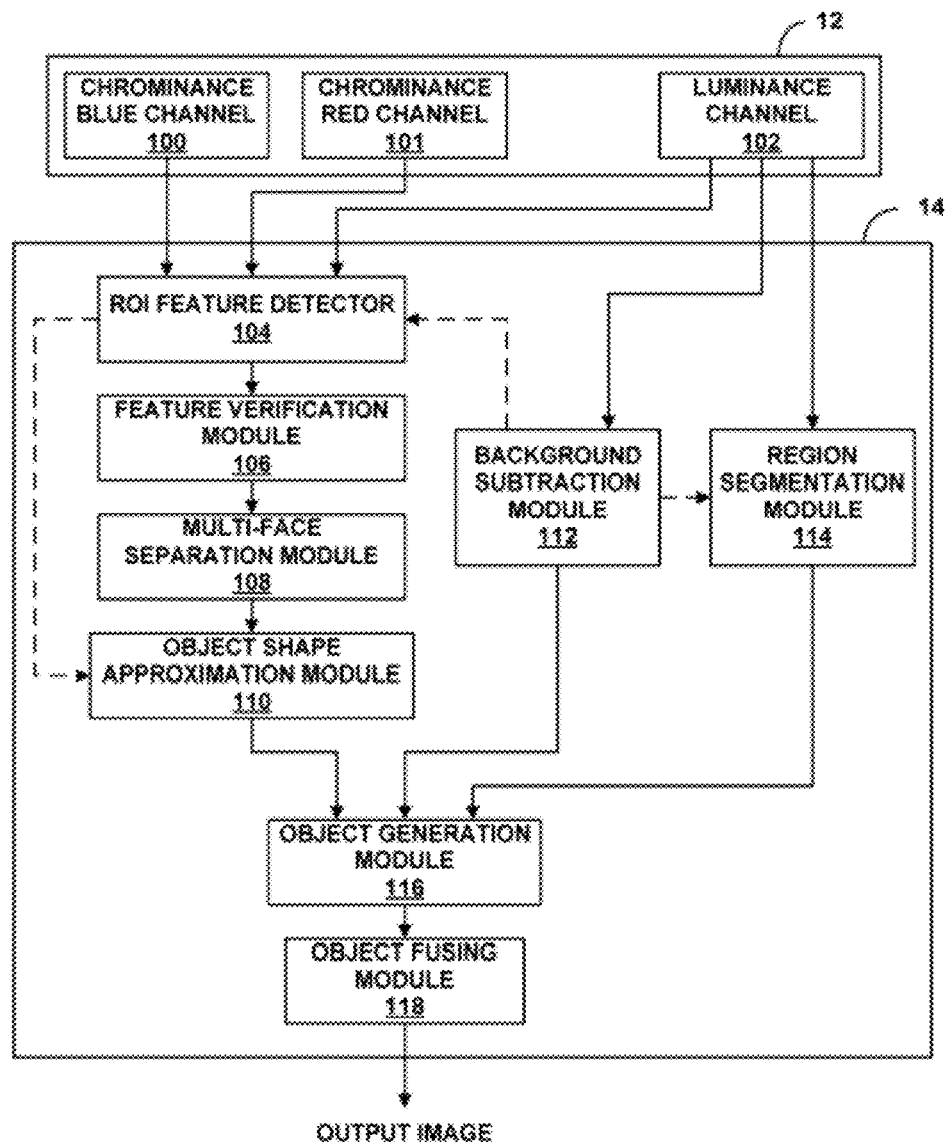
FIG. 15 is a block diagram illustrating a ROI object segmentation system when performing inter-mode segmentation on a frame of a video sequence received from a video source.
Figure 16:
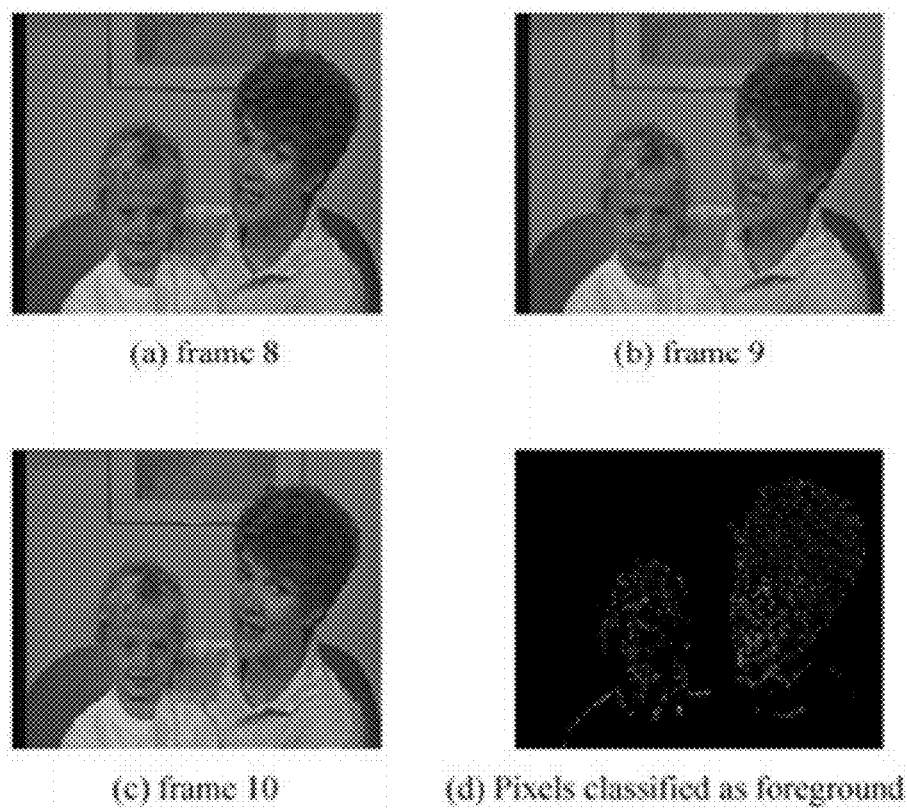
FIGS. 16 and 17 are screen shots illustrating exemplary results of the techniques implemented by a ROI object segmentation system during inter-mode segmentation.
Figure 17:
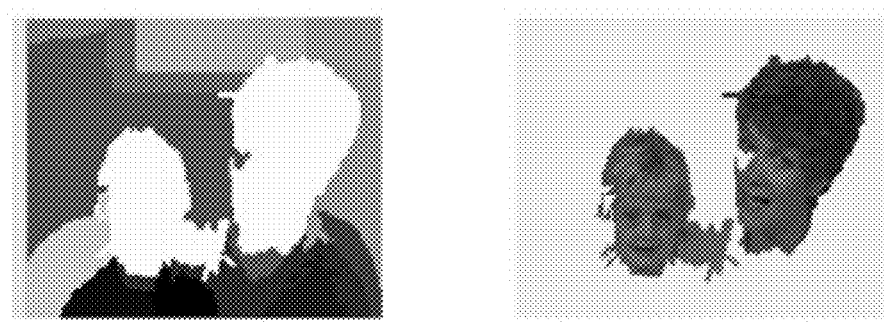

FIG. 15 is a block diagram illustrating ROI object segmentation system 14 when performing inter-mode segmentation on a frame of a video sequence received from video source 12. In this case, ROI object segmentation system 14 processes the frame of the video sequence based on motion information for the ROI object between the current frame and a previous or subsequent frame of the video sequence stored in video memory 16. FIGS. 16 and 17 are screen shots illustrating exemplary results of the techniques implemented by ROI object segmentation system 14 during inter-mode segmentation. In some embodiments, ROI object segmentation system 14 may perform intra-mode segmentation, as described in FIGS. 6-14, on some of the frames of a video sequence and perform inter-mode segmentation, described below, on the other frames of the video sequence based on one or more segmentation mode decision factors.

As described above, ROI object segmentation system 14 implements techniques to automatically segment a ROI object, such as a human head and shoulder area, from a video frame of a video sequence received from video source 12. ROI object segmentation system 14 performs inter-mode segmentation based on motion information for the ROI object. The disclosed techniques include a technique for detecting moving regions within a foreground object based on background modeling and subtraction. Successfully detecting the moving foreground region may improve performance speed of ROI feature detection during inter-mode segmentation.

In the embodiment illustrated in FIG. 15, video source 12 again includes a chrominance blue channel (Cb) 100, a chrominance red channel (Cr) 101, and a luminance channel (Y) 102. ROI object segmentation system 14 further includes a background subtraction module 112 when performing inter-mode segmentation as illustrated in FIG. 15. In this case, ROI object segmentation system 14 also includes the components used when performing intra-mode segmentation as illustrated in FIG. 6. For example, ROI object segmentation system 14 includes a ROI feature detector 104 that comprises face mask detector 64, eye detector 68, and mouth detector 67 from FIG. 6. In addition, ROI object segmentation module 14 also includes feature verification module 106, multi-face separation module 108, object shape approximation module 110, region segmentation module 114, object generation module 116, and object fusing module 118, which may operate in manner similar to corresponding components in FIG. 6.

Background subtraction module 112 interacts with ROI feature detector 104 and region segmentation module 114 to support inter-mode segmentation. With background subtraction module 112, system 14 identifies a moving foreground region of the video frame representing movement relative to a different video frame in the video sequence. In particular, to identify the moving foreground region, background subtraction module 112 compares first locations of pixels within the ROI object of the video frame to second locations of the pixels within the different video frame, e.g., a previous frame in the video sequence.

Background subtraction module 112 then classifies pixels that have not moved from the second location as background pixels, and classifies pixels that have moved from the second location as foreground pixels. The moving foreground region is identified based on the identified foreground pixels. System 14 then detects ROI features within a combined foreground region of the video frame corresponding to the moving foreground region and a foreground region previously identified in the different, e.g., previous, video frame. Based on the detected ROI features, shape approximation module 110 approximates a shape of an ROI object within the video frame.

Background subtraction module 112 takes advantage of the temporal correlation of consecutive video frames of the video sequence. Background subtraction module 112 conducts a pixel-by-pixel classification process of pixels within the ROI object of the video sequence received from video source 12. In this way, background subtraction module 112 determines which pixels of the current frame are background pixels based on motion information between the current frame and a previous or subsequent frame of the video sequence retrieved from video memory 16. In other words, background subtraction module 112 uses additional information available in inter-mode operation to quickly and efficiently find the moving region of the foreground object. Again, background subtraction module 112 classifies those pixels of the current frame that have not moved from their previous location as background pixels. In turn, background subtraction module 112 then classifies those pixels that have moved from their previous location as foreground pixels. In this way, background subtraction module 112 is more efficient and has lower complexity than a motion estimation-based technique.

Background subtraction module 112 may provide one or more benefits. For example, the search space of the face mask can be reduced from the entire image to the moving foreground region plus the face mask region from the previous frame, which may be considered a combined foreground region. In addition, the facial features will be either inside the moving foreground regions or in the same location as in the previous frame. As another possible benefit, the connected moving foreground regions can be treated as a homogeneous region.

FIG. 16 illustrates an example of foreground pixel classification based on pixel motion between frames of the "Mother and Daughter" video sequence. In FIG. 16, as the movement of the foreground object from frame 8 to 10 is rather small, background subtraction module 112 classifies only portion of the head pixels as foreground pixels while the body pixels are static during the first 10 frames.

In order to perform the pixel-by-pixel classification process, background subtraction module 112 applies a background model. In particular, background subtraction module 112 adapts a mixture of K Gaussian distributions to model the pixel intensity (e.g., K=5) where each Gaussian is weighted according to the frequency with which it explains the observed background. Therefore, the probability that a certain pixel within the foreground region has intensity $X_t$ at time t is estimated as:

$$P(X_t) = \sum_{i=1}^{K} w_{i,t} \frac{1}{\sqrt{2\pi}\,\sigma_i} e^{-\frac{1}{2}(X_t - \mu_{i,t})^T \sum^{-1}(X_t - \mu_{i,t})}, \quad (5)$$

where $w_{i,t}$ is the normalized weight, $\mu_i$ and $\sigma_i$ are the mean and the standard deviation of the ith distribution.

As the parameters of the mixture model of each pixel change, background subtraction module 112 determines which of the Gaussians of the mixture are most likely produced by background processes. Based on heuristic information, background subtraction module 112 selects the Gaussian distributions which have the most supporting evidence and the least variance. It is for this reason that the K distributions are ordered based on the value of w/σ. This ordering of the model is effectively an ordered list, where the most likely background distributions remain on top and the less probable transient background distributions gravitate toward the bottom. Background subtraction module 112 may find the most likely distribution models based on equation (6) given below.

$$B = \operatorname{argmin}_b \left( \sum_{j=1}^{b} w_j > T \right), \quad (6)$$

where the threshold T is the fraction of the total weight given to the background.

Then, background subtraction module 112 checks the new pixel against the existing K Gaussian distributions until a match is found. Background subtraction module 112 finds a match when the distance between the mean of the distribution and the new pixel value is within 2.5 standard deviations of the distributions. If none of the K distributions matches the current pixel value, the least probable distribution which has the smallest value of w/σ is replaced by a new distribution with the current new pixel value as the mean, an initially high variance and low prior weight. In general, a new pixel value can always be represented by one of the major components of the mixture model of K Gaussian distributions. If this matched distribution is one of the B background distributions, the new pixel is marked as background. If not, the pixel is marked as foreground.

In order to keep the mixture model adaptive, background subtraction module 112 continuously updates the model parameters using the new pixel values. For the matched Gaussian distribution, background subtraction module 112 updates all the parameters at time t with this new pixel value $X_t$. In addition, background subtraction module 112 updates the prior weight as $$w_t = (1-\alpha) w_{t-1} + \alpha, \quad (7)$$

and the mean and variance are updated as $$\mu_t = (1-\rho)\mu_{t-1} + \rho X_t, \quad (8)$$

$$\text{and } \sigma_t^2 = (1-\rho)\sigma_{t-1}^2 + \rho(X_t - \mu_t)^2, \quad (9)$$

where α is the learning rate controlling adaptation speed, 1/α defines the time constant which determines change, and ρ is the probability associated with the current pixel, scaled by the learning rate α. Therefore ρ may be represented by $$\rho = \alpha \frac{1}{\sqrt{2\pi}\,\sigma_i} e^{-\frac{(X_t - \mu_t)^2}{\sigma_i^2}}. \quad (10)$$

For unmatched distributions, the mean $\mu_t$ and variance $\sigma_t$ remain unchanged, while background subtraction module 112 updates the prior weight as $$w_t = (1-\alpha) w_{t-1}. \quad (11)$$

One advantage of this updating method is that, when background subtraction module 112 allows an object to become part of the background, the original background model is not destroyed. In other words, the original background distribution remains in the mixture until it becomes the least probable distribution and a new color is observed. Therefore, if this static object happens to move again, background subtraction module 112 will rapidly reincorporate the previous background distribution into the model.

Once background subtraction module 112 classifies the moving pixels as foreground pixels, region segmentation module 114 may perform split-and-merge region growing on the foreground pixels to create a moving foreground region of the video frame. In this manner, the classified foreground pixels are used to merge the regions obtained from the region growing approach, and thereby form the foreground regions. In particular, by fusing the moving foreground region resulting from background subtraction with split-and-merge growing techniques, a moving region of the foreground object can be obtained.

Detecting the foreground pixels and creating the moving foreground region may increase robustness of the inter-mode segmentation process and speed up ROI feature detection performance. The search for ROI features can be confined to the combined foreground region, including the moving foreground region and the foreground region formed by the face mask of the previous frame. FIG. 17 illustrates an a moving foreground region extracted from a background area of a video frame of the "Mother and Daughter" video sequence.

ROI object segmentation system 14 may then use substantially similar techniques to complete the inter-mode segmentation process as are used to perform intra-mode segmentation described above. For example, ROI feature detector 100 detects a face mask and facial features within the combined foreground region formed by the moving foreground region and the face mask and facial feature locations within the previous frame. In this way, background subtraction module 112 reduces the computational complexity of performing ROI feature detection within the entire video frame. Object fusing module 118 then merges the foreground objects to form an output image. ROI object segmentation module 14 sends the output image of the segmented frame to multimedia application 18.

In the illustrated embodiment, no new faces or facial features are introduced during the video sequence. Therefore, ROI object segmentation system 14 may skip feature verification module 108 and multi-face separation module 108 when performing inter-mode segmentation, as indicated by the dashed line extending between ROI feature detector 104 and object shape approximation module 110. In particular, if the detected facial features are located close to the features in the previous frame, which means the object in the previous frame does not present significant movement, then the object of the current frame can be quickly generated by using the object shape approximation module 110 and object generation module 116, without the need to apply the functions of feature verification module 106 and multi-face separation module 108.

Otherwise, if new faces or facial features are introduced, the entire process is applied, i.e., feature verification module 106, multi-face separation module 108, object shape approximation module 110 and object generation module 116 are applied. In object generation module 116, connected moving foreground regions are treated as homogeneous regions. Object fusing module 118 merges the foreground objects to form an output image. ROI object segmentation system 14 sends the output image of the segmented frame to multimedia application 18.

Face mask and facial feature detector 100 may detect additional ROI features within a video frame during inter-mode segmentation. In this case, ROI object segmentation system 14 may use feature verification module 106 to verify the newly detected facial features. In addition, system 14 may use multi-face separation module 108, followed by object shape approximation module 110 and object generation module 116, for new faces included in the video frame.

Figure 18:
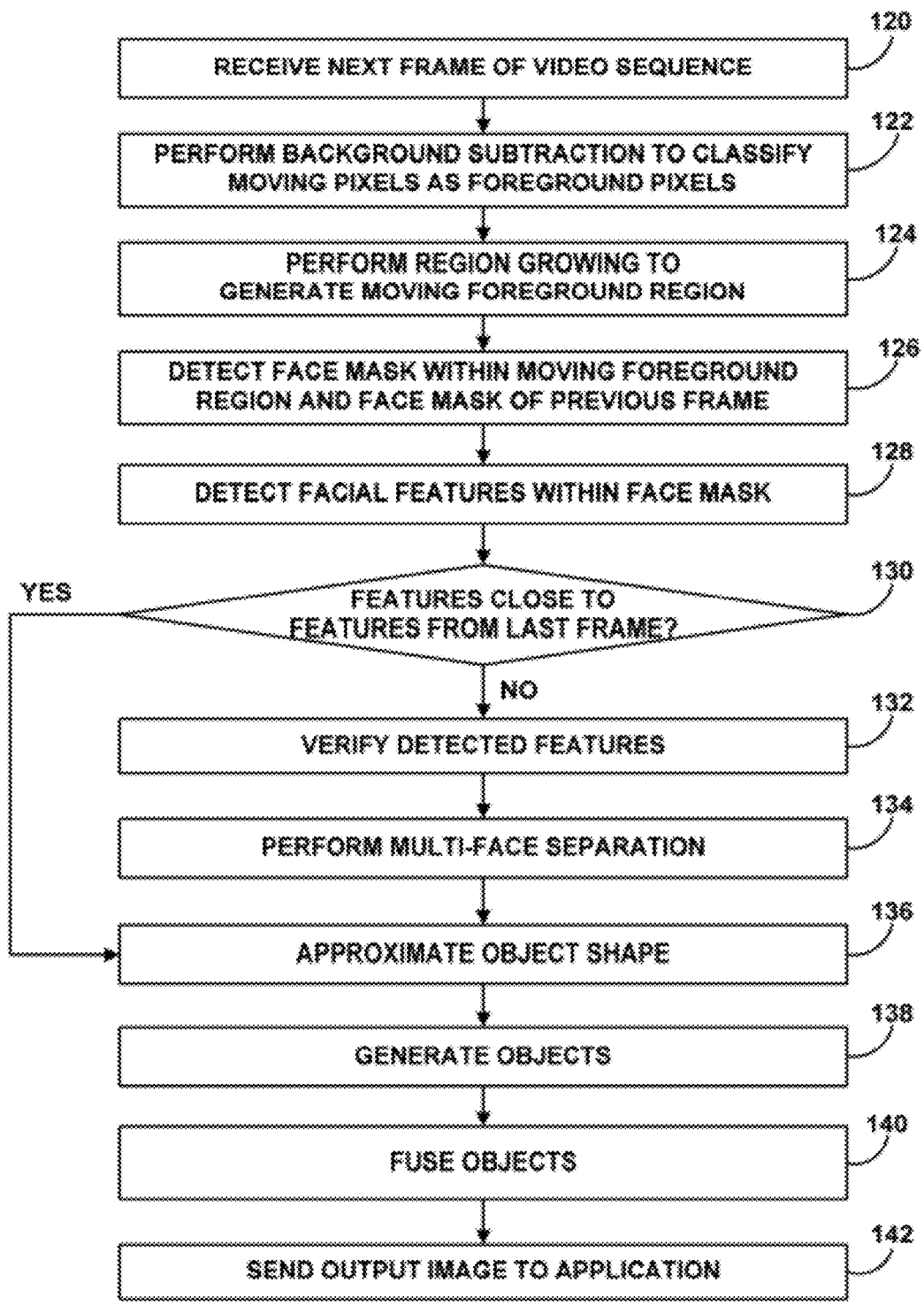
FIG. 18 is a flow diagram illustrating operation of a ROI object segmentation system performing inter-mode segmentation.

FIG. 18 is a flow diagram illustrating operation of ROI object segmentation system 14 performing inter-mode segmentation. The operation will be described herein in reference to ROI object segmentation system 14 illustrated in FIG. 15 ROI object segmentation system 14 receives a frame of a video sequence from video source 12 and retrieves a previous frame of the video sequence from video memory 16 (120). In the case of inter-mode segmentation, ROI object segmentation system 14 processes the frame of the video sequence based on motion information for the ROI object between the current frame and the previous frame of the video sequence. In some embodiments, ROI object segmentation system 14 may alternatively or additionally use motion information indicating ROI object motion with respect to a subsequent video frame.

Background subtraction module 112 performs background subtraction on the received video frame to classify moving pixels within the ROI object between the previous frame and the current frame as foreground pixels (122). Background subtraction module 112 conducts a pixel-by-pixel classification process in order to determine which pixels of the current frame have moved from their previous location in the previous frame. Once background subtraction module 112 classifies the moving pixels as foreground pixels, region segmentation module 114 may perform split-and-merge region growing on the foreground pixels to create a moving foreground region of the video frame (124).

ROI object segmentation system 14 may then use substantially similar techniques to complete the inter-mode segmentation process as are used to perform intra-mode segmentation described above. ROI feature detector 104 detects a face mask within a region including both the moving foreground region and the face mask location from the previous frame (126), i.e., within a combined foreground region. Furthermore, ROI feature detector 104 detects facial features, e.g., eye and mouth candidates, within the combined foreground region including the moving foreground region and the facial feature locations within the previous frame (128).

If the facial features detected by ROI feature detector 104 are located close to the facial features detected in the previous frame (130), the object in the previous frame does not present significant movement. In this case, the object of the current frame can be quickly generated by using the object shape approximation module 110 (136) and object generation module 116 (138), while skipping the functions of feature verification module 106 (132) and multi-face separation module 108 (134).

Otherwise, if the facial features detected by ROI feature detector 104 are not located close to the facial features detected in the previous frame, the object in the previous frame has moved significantly. In this case, the entire process is applied. In particular, feature verification module 106 verifies the detected features (132), and multi-face separation module 108 performs face separation (134). Then, object shape approximation module 110 is applied (136), followed by object generation module 116 (138). In object generation module 116, connected moving foreground regions are treated as homogeneous regions to generate the object (138). Object fusing module 118 then merges the foreground objects to form an output image (140). ROI object segmentation system 14 sends the output image of the segmented frame to multimedia application 18 (142).

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by a programmable processor, which may be realized by one or more digital signal processors (DSPs), general purpose microprocessors, application specific integrated circuits (ASICs), field programmable logic arrays (FPGAs), or other combinations of equivalent integrated or discrete logic circuitry. In some embodiments, the functionality described herein may be provided within dedicated software modules or hardware units configured for automatic object segmentation, or incorporated in an automatic object segmentation system.

In this disclosure, various techniques have been described for automatic segmentation of a ROI object from a video sequence. An ROI object segmentation system may implement one or more of the disclosed techniques individually or in combination to provide an accurately segmented ROI object for use in a multimedia application, such as a VT application, a video streaming application or a video surveillance application.

The disclosed techniques include a hybrid technique that includes ROI feature detection, region segmentation, and background subtraction. The disclosed techniques may include both intra-mode and inter-mode object segmentation. Inter-mode segmentation takes advantage of the temporal correlation of consecutive video frames of a video sequence by using background modeling and subtraction instead of conventional computationally intensive motion estimation operations to speed up performance of the ROI object segmentation system. The disclosed techniques also include facial feature verification, multi-face separation, and ROI object generation to speed up performance of intra-mode segmentation by the ROI object segmentation system. These and other embodiments are within the scope of the following claims.

The invention claimed is:

1. A method comprising:
receiving a video frame of a video sequence;
determining an amount of motion activity between the video frame and the different video frame of the video sequence
applying one or more segmentation mode decision factors to the video frame to select a segmentation mode from at least a first segmentation mode and a second segmentation mode comprising selecting the first segmentation mode when the amount of motion activity is above a pre-determined level;
segmenting a region of interest (ROI) object from the video frame without reference to motion information for the video frame when the first segmentation mode is selected; and
segmenting an ROI object from the video frame based on motion information for the video frame and a different video frame of the video sequence when the second segmentation mode is selected.

2. The method of claim 1, wherein the different video frame is a previous video frame in the video sequence.

3. The method of claim 1, wherein applying the one or more segmentation mode decision factors comprises determining a desired segmentation quality of the video frame from an end-user, and selecting the first segmentation mode when the desired segmentation quality is above a pre-determined level.

4. The method of claim 1, wherein applying the one or more segmentation mode decision factors comprises determining an amount of similarity between the video frame and the different video frame of the video sequence, and selecting the first segmentation mode when the amount of similarity is below a pre-determined level.

5. The method of claim 4, wherein determining the amount of similarity comprises comparing a first color histogram of the video frame with a second color histogram of the different video frame to determine an amount of similarity between the first and second color histograms.

6. The method of claim 1, wherein determining the amount of motion activity comprises comparing a first location of the ROI object within the video frame with a second location of the ROI object within the different video frame to determine an amount of movement between the first and second locations.

7. The method of claim 1, wherein the different video frame directly precedes the video frame of the video sequence, wherein applying the one or more segmentation mode decision factors comprises determining the segmentation mode used to segment the different video frame of the video sequence, and selecting the second segmentation mode when the different video frame was segmented in the first segmentation mode.

8. The method of claim 1, wherein applying the one or more segmentation mode decision factors comprises determining a number of consecutive video frames of the video sequence that were segmented in the second segmentation mode, and selecting the first segmentation mode when the number of consecutive second segmentation mode video frames is above a pre-determined level.

9. A non-transitory computer-readable storage medium having stored thereon instructions that cause a programmable processor to:
receive a video frame of a video sequence;
determine an amount of motion activity between the video frame and the different video frame of the video sequence;
apply one or more segmentation mode decision factors to the video frame to select a segmentation mode from at least a first segmentation mode and a second segmentation mode comprising selecting the first segmentation mode when the amount of motion activity is above a pre-determined level;
segment a region of interest (ROI) object from the video frame without reference to motion information for the video frame when the first segmentation mode is selected; and
segment an ROI object from the video frame based on motion information for the video frame and a different video frame of the video sequence when the second segmentation mode is selected.

10. The non-transitory computer-readable storage medium of claim 9, wherein the instructions cause the programmable processor to determine a computational complexity of the video frame, and select the first segmentation mode when the computation complexity is above a pre-determined level.

11. The non-transitory computer-readable storage medium of claim 9, wherein the instructions cause the programmable processor to determine an amount of similarity between the video frame and the different video frame of the video sequence, and select the first segmentation mode when the amount of similarity is below a pre-determined level.

12. The non-transitory computer-readable storage medium of claim 11, wherein the instructions cause the programmable processor to compare a first color histogram of the video frame with a second color histogram of the different video frame to determine an amount of similarity between the first and second color histograms.

13. The non-transitory computer-readable storage medium of claim 9, wherein the instructions cause the programmable processor to compare a first location of the ROI object within the video frame with a second location of the ROI object within the different video frame to determine an amount of movement between the first and second locations.

14. The non-transitory computer-readable storage medium of claim 9, wherein the different video frame directly precedes the video frame of the video sequence, wherein the instructions cause the programmable processor to determine the segmentation mode used to segment the different video frame of the video sequence, and select the second segmentation mode when the different video frame was segmented in the first segmentation mode.

15. The non-transitory computer-readable storage medium of claim 9, wherein the instructions cause the programmable processor to determine a number of consecutive video frames of the video sequence that were segmented in the second segmentation mode prior to the video frame, and select the first segmentation mode when the number of consecutive second segmentation mode video frames is above a pre-determined level.

16. A video encoding device including a processor configured to:
receive a video frame of a video sequence;
determines an amount of motion activity between the video frame and the different video frame of the video sequence;
apply one or more segmentation mode decision factors to the video frame to select a segmentation mode from at least a first segmentation mode and a second segmentation mode, wherein the processor is configured to select the first segmentation mode when the amount of similarity is below a pre-determined level;

segment a region of interest (ROI) object from the video frame without reference to motion information for the video frame when the first segmentation mode is selected; and segment an ROI object from the video frame based on motion information for the video frame and a different video frame of the video sequence when the second segmentation mode is selected.

17. The device of claim 16, wherein the processor determines a computational complexity of the video frame, and selects the first segmentation mode when the computation complexity is above a pre-determined level.

18. The device of claim 16, wherein the processor compares a first color histogram of the video frame with a second color histogram of the different video frame to determine an amount of similarity between the first and second color histograms.

19. The device of claim 16, wherein the processor, and selects the first segmentation mode when the amount of motion activity is above a pre-determined level.

20. The device of claim 19, wherein the processor compares a first location of the ROI object within the video frame with a second location of the ROI object within the different video frame to determine an amount of movement between the first and second locations.

21. The device of claim 16, wherein the different video frame directly precedes the video frame of the video sequence, and wherein the processor determines the segmentation mode used to segment the different video frame of the video sequence, and selects the second segmentation mode when the different video frame was segmented in the first segmentation mode.

22. The device of claim 16, wherein the processor determines a number of consecutive video frames of the video sequence that were segmented in the second segmentation mode prior to the video frame, and selects the first segmentation mode when the number of consecutive second segmentation mode video frames is above a pre-determined level.

23. A video coding device comprising:
means for receiving a video frame of a video sequence;
means for determining an amount of motion activity between the video frame and the different video frame of the video sequence
means for applying one or more segmentation mode decision factors to the video frame to select a segmentation mode from at least a first segmentation mode and a second segmentation mode comprising selecting the first segmentation mode when the amount of motion activity is above a pre-determined level;
means for segmenting a region of interest (ROI) object from the video frame without reference to motion information for the video frame when the first segmentation mode is selected; and
means for segmenting an ROI object from the video frame based on motion information for the video frame and a different video frame of the video sequence when the second segmentation mode is selected.

* * * * *